US010620363B2

(12) United States Patent
Van Bommel et al.

(10) Patent No.: US 10,620,363 B2
(45) Date of Patent: Apr. 14, 2020

(54) COLOR CONTROL FOR LUMINESCENT LIGHT GUIDE

(71) Applicant: SIGNIFY HOLDING B.V., Eindhoven (NL)

(72) Inventors: Ties Van Bommel, Eindhoven (NL); Rifat Ata Mustafa Hikmet, Eindhoven (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 295 days.

(21) Appl. No.: 15/516,739

(22) PCT Filed: Oct. 1, 2015

(86) PCT No.: PCT/EP2015/072705
§ 371 (c)(1),
(2) Date: Apr. 4, 2017

(87) PCT Pub. No.: WO2016/055352
PCT Pub. Date: Apr. 14, 2016

(65) Prior Publication Data
US 2017/0307807 A1 Oct. 26, 2017

(30) Foreign Application Priority Data

Oct. 7, 2014 (EP) .................... 14187893

(51) Int. Cl.
*F21V 8/00* (2006.01)
*H05B 45/00* (2020.01)
*H05B 45/10* (2020.01)

(52) U.S. Cl.
CPC ......... *G02B 6/0068* (2013.01); *G02B 6/0003* (2013.01); *G02B 6/0055* (2013.01); *H05B 45/00* (2020.01); *H05B 45/10* (2020.01)

(58) Field of Classification Search
None
See application file for complete search history.

(56) References Cited

U.S. PATENT DOCUMENTS 8,118,441 B2 2/2012 Hessling
8,238,703 B2 8/2012 Meir et al.
(Continued)

FOREIGN PATENT DOCUMENTS

CN 101447538 A 6/2009
CN 203348949 U 12/2013
(Continued)

OTHER PUBLICATIONS

M. Nazarov, "Synthesis and Luminescent Properties of Multiphase Green Phosphor Based on Strontium Thiogallate", Moldavian Journal of the Physical Sciences, vol. 7, No. 4, Oct. 1, 2008, pp. 420-432.
(Continued)

*Primary Examiner* — Britt D Hanley
(74) *Attorney, Agent, or Firm* — Stephen M. Kohen

(57) ABSTRACT

The invention provides a lighting device (100) configured to provide lighting device light (101). The lighting device (100) comprises a plurality of light sources (200) configured to provide light source light (201), the plurality of light sources (200) comprising at least a first light source (210) configured to generate first light source light (211) and a second light source (220) configured to generate second light source light (221). The lighting device further comprises a light guide (300) comprising: a luminescent material (310) excitable by the light source light (201), and configured to provide luminescent material light (311), wherein the luminescent material (310) is configured to reabsorb at least part of its luminescent material light (311), a light exit window (330) for escape of the luminescent material light (311) from the light guide (300), and a plurality of light
(Continued)

incoupling areas (320) arranged perpendicular to the light exit window (330) and comprising at least a first light incoupling area (321) configured at a first distance (d1) from the light exit window (330), and a second light incoupling area (322) configured at a second distance (d2) from the light exit window (330). The first light source (210) is configured to provide said first light source light (211) to the first light incoupling area (321), wherein the second light source (220) is configured to provide said second light source light (221) to the second light incoupling area (322), wherein the first distance (d1) is unequal to the second distance (d2). The lighting device further comprises a control unit (500) arranged for controlling the color temperature of the lighting device light by independently controlling the plurality (m) of light sources (200) dependent on the distance of each light source from the light exit window (330).

19 Claims, 6 Drawing Sheets

(56) References Cited

U.S. PATENT DOCUMENTS

| | | | |
|---|---|---|---|
| 8,503,073 | B2 | 8/2013 | Ramuz et al. |
| 2004/0066824 | A1 | 4/2004 | Magno et al. |
| 2009/0196046 | A1 | 8/2009 | Rutherford et al. |
| 2009/0268461 | A1 | 10/2009 | Deak et al. |
| 2013/0215643 | A1* | 8/2013 | Hikmet ................ G02B 6/0003 362/606 |

FOREIGN PATENT DOCUMENTS

| | | |
|---|---|---|
| CN | 203348949 U | 12/2013 |
| EP | 2447746 A1 | 5/2012 |
| EP | 3044503 A1 | 7/2016 |
| JP | 2008536266 A | 9/2008 |
| JP | 2009535081 A | 10/2009 |
| JP | 2013094496 A | 5/2013 |
| JP | 2014518007 A | 7/2014 |
| TW | 200815806 A | 4/2008 |
| WO | 2008079910 A2 | 7/2008 |
| WO | WO2011050441 A1 | 5/2011 |
| WO | 2015036224 A1 | 3/2015 |

OTHER PUBLICATIONS

CRC Press, Handbook of Chemistry and Physics, 69th Edition, Anniversary Edition, 1988-1989, 3 pages, total.

A.P. Piquette, et al., "An Investigation of Self-Absorption and Corresponding Spectral Shift in Phosphors", ECS Transactions, 41 (37), 2012, pp. 1-9.

* cited by examiner

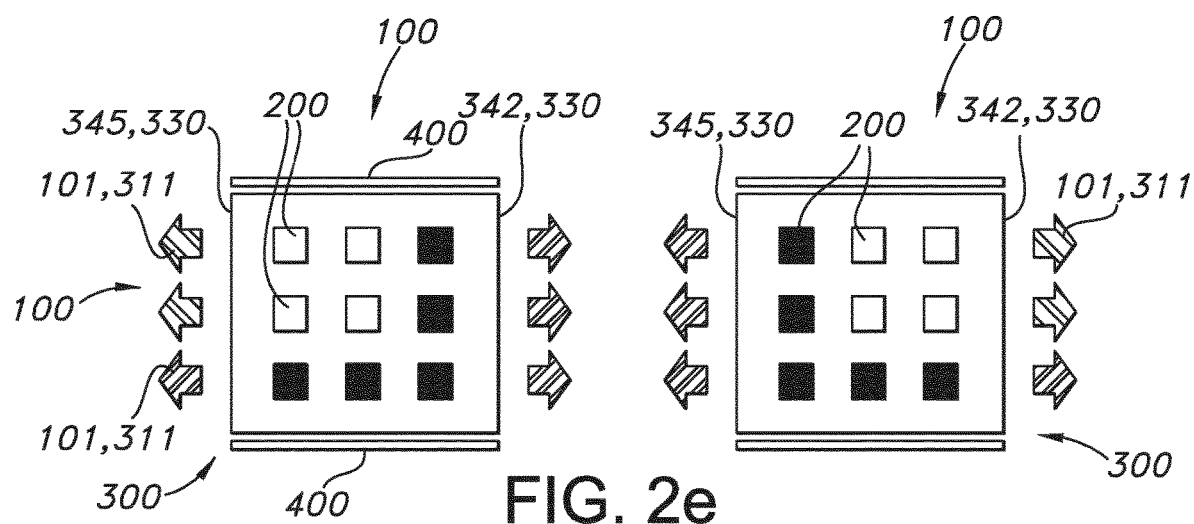
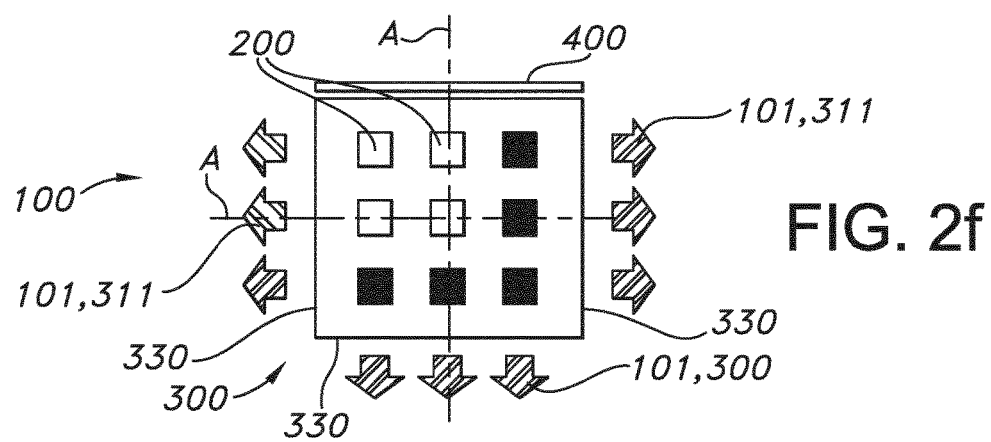

COLOR CONTROL FOR LUMINESCENT LIGHT GUIDE

CROSS-REFERENCE TO PRIOR APPLICATIONS

This application is the U.S. National Phase application under 35 U.S.C. § 371 of International Application No. PCT/EP2015/072705, filed on Oct. 1, 2015, which claims the benefit of European Patent Application No. 14187893.4, filed on Oct. 7, 2014. These applications are hereby incorporated by reference herein.

FIELD OF THE INVENTION

The invention relates to a lighting device for controlling a spectral distribution of the light of such lighting device.

BACKGROUND OF THE INVENTION

Devices that can provide different colors are known in the art. US2014140090, for instance, describes an illuminating color displaying device having at least one illuminating surface comprising a plurality of different light sources emitting light at different wavelengths, and structured to provide changes in intensity of emitted light, at least one glass core light diffusing waveguide, said glass core light diffusing waveguide being coupled to said plurality of different light sources emitting light at different wavelengths, the light diffusing waveguide comprising a region with a plurality of nano-sized structures configured to scatter guided light via said nano-sized structures towards an illuminating surface and, in conjunction with said illuminating surface causing emission of colored light from the illuminating surface.

SUMMARY OF THE INVENTION

High brightness light sources are interesting for various applications including spots and digital light projection. Amongst others for this purpose, it is possible to make use of so-called light concentrators where shorter wavelength light is converted to longer wavelengths in a highly transparent luminescent material. A rod of such a transparent luminescent material is illuminated by LEDs to produce longer wavelengths within the rod (wavelength conversion). Converted light which is in the luminescent material, such as a doped garnet, in the light guide mode can then be extracted from one of the surfaces leading to an intensity gain.

For various applications such as light engines, lamps, luminaires and projectors, one would like to control the color (temperature) of the light source e.g. for black body dimming (for mimicking the behavior of a light source such as an incandescent light source) or adapting the color gamut of a light system (for adjusting the color quality). This can be done by combining light emitted from multiple sources. However, the use of multiple LEDs may lead to the increase in the area of the emitting surface.

Hence, it is an aspect of the invention to provide an alternative lighting device, which preferably further at least partly obviate one or more of above-described limitations and which may especially be able to control the color (temperature) of the lighting device light.

For this purpose, we suggest the use of a luminescent concentrator based light source which is pumped by at least two light sources. The light concentrator is selected such that there is (preferably) a (large) spectral overlap between the emission and excitation spectra (of the luminescent material comprised by the concentrator). The large overlap leads to a strong re-absorption of light emitted by the luminescent concentrator and hence to a strong dependence of the end spectrum to the length of the luminescent rod. When such a rod is pumped from the sides with a number of light sources, such as LEDs, along the length of the rod, then the spectrum of the light emitted from the exit surface will depend on the position of the LED with respect to the exit surface. Therefore, by selecting which LED or LEDs to switch on and adjusting their relative intensity depending on the distance from the LED to the exit surface the color (temperature) of the light coming out of the exit surface can be adjusted. For example the intensity of a first LED located at a larger distance from the exit surface than a second LED will be adjusted and set at a higher intensity than an intensity of the second LED wherein the higher intensity corresponds to, or is related to, the larger distance, or relative distance, of the first and second LED to the exit surface. Thus, how each LED is controlled, or adjusted, depends on the distance of the LED to the exit surface.

More in general, in a first aspect the invention provides a lighting device configured to provide lighting device light, the lighting device comprising (i) a plurality (m) of light sources configured to provide light source light, i.e. especially with m≥2, such as ≥4, like≥8, the plurality (m) of light sources comprising at least a first light source configured to generate first light source light and a second light source configured to generate second light source light; (ii) a light guide (herein also indicated as "lightguide or waveguide") comprising (i) a luminescent material excitable by the light source light (of the light sources), and configured to provide luminescent material light, wherein the luminescent material in the light guide is configured to reabsorb at least part of its luminescent material light, (ii) a light exit window ("exit window") for escape of the luminescent material light from the light guide, (iii) a plurality of light incoupling areas (or regions) comprising at least a first light incoupling area for receipt of first light source light and configured at a first distance (d1) from the light exit window, and a second light incoupling area (at a same or another face of the light guide) for receipt of the second light source light and configured at a second distance (d2) from the light exit window; wherein the first light source is configured to provide said first light source light to the first light incoupling area, wherein the second light source is configured to provide said second light source light to the second light incoupling area, wherein the first distance (d1) is unequal to the second distance (d2); and a control unit arranged for controlling the color temperature of the lighting device light by independently controlling the plurality (m) of light sources dependent on the distance of each light source from the light exit window, thereby especially suitable for controlling a spectral distribution of the luminescent material light (and thus the lighting device light, as it may comprise at least part of the luminescent material light). In other words, the control unit takes into account the distance between the exit window and a light source in selecting the settings of the light source in order to provide for a predetermined color temperature of the light exiting from the light exit window.

Hence, especially a difference in position of light incoupling areas when illuminating a light guide comprising a luminescent material with a plurality (m) of light sources configured to provide light source light is applied, wherein the light source light of the plurality (m) of light sources have spectral overlap, for controlling a spectral distribution of a luminescent material light of said luminescent material when emanating from a light exit window from said light guide. Hence, the invention also provides a method of lighting having a difference in position of light incoupling areas when illuminating a light guide comprising a luminescent material with a plurality (m) of light sources configured to provide (substantially identical) light source light, wherein (thus) the light source light of the plurality (m) of light sources have spectral overlap, for controlling a spectral distribution of a luminescent material light of said luminescent material when emanating from a light exit window from said light guide.

With such a lighting device and by using the above indicated principle, by tuning the intensity of the light source light of the plurality of light sources, lighting device light is produced of which the spectral distribution (and optionally the intensity) is dependent on the intensity of the light source light of the respective light sources. Light sources arranged further away from the light exit window will excite luminescent material, and thereby generate luminescent material light, further away from the light exit window. This will lead to a longer path length (of the luminescent material emission) through the wavelength converter which will lead to reabsorption and thus change of the emission spectrum. In general, the further away the light source is arranged from the light exit window, i.e. the further away the light incoupling area from the light guide is arranged from the light exit window, the more red-shifted the luminescent material light will be when escaping from the light exit window. Herein, the phrase "light sources arranged further away from the light exit window" and similar phrases indicate that the light incoupling area of such light source is further away from the light exit window. As distance, the shortest distance from the light incoupling area through the light guide material to the light exit window is chosen. The larger this distance, the relatively more reabsorption may occur. Hence, with light sources that are of the same type, a color shift of the lighting device light can be created, due to the path length difference(s) of the emission light (luminescent material light), generated in the light guide, to the light exit window.

Especially, the light sources are light sources that during operation emit (light source light) at least light at a wavelength selected from the range of 200-490 nm, especially light sources that during operation emit at least light at wavelength selected from the range of 400-490 nm, even more especially in the range of 440-490 nm. This light may partially be used by the luminescent material. Hence, in a specific embodiment, the light source is configured to generate blue light. In a specific embodiment, the light source comprises a solid state LED light source (such as a LED or laser diode). The term "light source" may also relate to a plurality of light sources, such as e.g. 2-20 (solid state) LED light sources, though much more light sources may be applied. Hence, the term LED may also refer to a plurality of LEDs. Hence, as indicated herein, the term "solid state light source" may also refer to a plurality of solid state light sources. In an embodiment (see also below), these are substantially identical solid state light sources, i.e. providing substantially identical spectral distributions of the solid state light source radiation. In embodiments, the solid state light sources may be configured to irradiate different faces of the light guide. The plurality of light sources comprises at least the first light source and the second light source and optionally further light sources. The light sources generate light source light, which may especially have substantially identical spectral distributions. To distinguish the contributions of the different light sources, the light source light of the first light source is indicated as first light source light and the light source light of the second light source is indicated as second light source light, etc., even though these light source lights may be substantially identical. Hence, the luminescent material is excitable by the (first, second, etc.) light source light (of the first light source, the second light source, etc.).

Here, the invention is especially defined with respect to at least a first light source and a second light source. However, the lighting device may include a plurality of light sources (especially solid date light sources), in general even much more than these (at least) two light sources. Hence, in an embodiment the lighting device comprises said plurality (m) of light sources wherein m is at least 3, configured to provide light sources to irradiate (illuminate) incoupling areas of the light guide, with the light incoupling areas configured at distances from the light exit window, wherein each distance (i.e. the first distance, the second distance, etc.) is different. As indicated above, m may range from 2 and higher, up to tens or even hundreds of light sources, such as LEDs. When using a substantial number of light sources, the light sources are not necessarily all arranged at unequal distances from the light exit window. Especially when light sources are configured to illuminate different faces of a light guide, a plurality of light sources, or more precisely a plurality of light incoupling areas (optionally at different faces), may be configured at the same distances from the light exit window. In such embodiment, there may be subsets of light sources that are configured at the same distance.

Hence, in a further embodiment the plurality (m) of light sources may comprise two or more subsets each comprising one or more light sources, wherein each subset of light sources is configured to provide light source light to another face of the light guide. The control unit may be configured to control each individual light source but may also be configured to control each individual subset of light sources. Hence, the control unit may control the intensity of the light source light of the first light source and control the intensity of the light source light of the second light source (and control the intensity of light source light of further light sources), and mutually vary these intensities. In general, a subset may include light sources each providing a light incoupling area at the same distance from the light exit window. Hence, a first subset may include first light sources, a second subset may include second light sources, etc. However, there may also be a plurality of first subsets, each first subset including a plurality of first light sources, etc. Optionally, a plurality of first light sources may illuminate the same first light incoupling area. Additionally or alternatively, this may apply to a plurality of second light sources, etc. However, first light incoupling areas and second light incoupling areas are arranged at different distances from the light exit window.

There are at least two light incoupling areas. Such light incoupling area is the part of a face illuminated by the respective light source. Two or more light sources may irradiate the same face; hence, a face may include two or more light incoupling areas. However, two or more light sources may irradiate different faces; hence, two or more faces may each include one or more light incoupling areas.

The lighting device comprises a plurality of light sources. Especially, the light source light of the plurality (m) of light sources have spectral overlap, even more especially, they are of the same type and provide substantial identical light (having thus substantial the same spectral distribution). Hence, the light sources may substantially have the same emission maximum, such as within a bandwidth of 10 nm. However, this does not exclude the use of different types of light sources. Such light sources are herein indicated as further light sources (and are not indicated as first light source, second light source, third light source, etc.). Hence, in an embodiment the lighting device also comprises a further light source configured to provide further light source light, wherein the lighting device light comprises said luminescent material light and optionally said further light source light and optionally light source light. The light of the further light source may be used to excite the luminescent material as well in the light guide, or it may be used to excite another luminescent material in the light guide, or it may not substantially be absorbed by the luminescent material in the light guide, or it may be configured (substantially) independent of the light guide, etc. Hence, the lighting device light may optionally include a further light source light from the further light source.

The light guide may have any shape, such as beam like or rod like. However, the light guide may also be disk like, etc. The invention is not limited to specific embodiments of shapes, neither is the invention limited to embodiments with a single exit window. Below, some specific embodiments are described in more detail.

In a specific embodiment, the light guide may especially have an aspect ratio larger than 1, i.e. the length is larger than the width. In general, the light guide is a rod or bar (beam), though the light guide does not necessarily have a square, rectangular or round cross-section. In general, the light source is configured to irradiate one of the longer faces (side edge), herein indicated as radiation input face, and radiation escapes from a face at a front (front edge), herein indicated as radiation exit face. Especially, in embodiments the solid state light source, or other light source, is not in physical contact with the light guide. Physical contact may lead to undesired outcoupling and thus a reduction in concentrator efficiency. Further, in general the light guide comprises two substantially parallel faces, the radiation input face and opposite thereof the opposite face. These two faces define herein the width of the light guide. In general, the length of these faces defines the length of the light guide. However, as indicated above, and also below, the light guide may have any shape, and may also include combinations of shapes. Especially, the radiation input face has an radiation input face area (A), wherein the radiation exit face has a radiation exit face area (E), and wherein the radiation input face area (A) is at least two times larger than the radiation exit face area (E), especially at least 5 times larger, such as in the range of 2-50,000, especially 5-5,000 times larger. This allows e.g. the use of a plurality of solid state light sources (see also below). For typical applications like in automotive or digital projectors, a small but high intense emissive surface is desired. This cannot be obtained with a single LED, but can be obtained with the present lighting device. Especially, the radiation exit face has a radiation exit face area (E) selected from the range of 1-100 mm$^2$. With such dimensions, the emissive surface can be small, whereas nevertheless high intensity may be achieved. As indicated above, the light guide in general has an aspect ratio (of length/width). This allows a small radiation exit surface, but a large radiation input surface, e.g. irradiated with a plurality of solid state light sources. In a specific embodiment, the light guide has a width (W) selected from the range of 0.5-100 mm. The light guide is thus especially an integral body, having the herein indicated faces.

The generally rod shaped or bar shaped light guide can have any cross sectional shape, but in embodiments has a cross section the shape of a square, rectangle, round, oval, triangle, pentagon, or hexagon. Generally the light guides are cuboid, but may be provided with a different shape than a cuboid, with the light input surface having somewhat the shape of a trapezoid. By doing so, the light flux may be even enhanced, which may be advantageous for some applications. Hence, in some instances the term "width" may also refer to diameter, such as in the case of a light guide having a round cross section.

The light guides may also be cylindrically shaped rods. In embodiments the cylindrically shaped rods have one flattened surface along the longitudinal direction of the rod and at which the light sources may be positioned for efficient incoupling of light emitted by the light sources into the light guide. The flattened surface may also be used for placing heat sinks. The cylindrical light guide may also have two flattened surfaces, for example located opposite to each other or positioned perpendicular to each other. In embodiments the flattened surface extends along a part of the longitudinal direction of the cylindrical rod.

The light guides as set forth below in embodiments according to the invention may also be folded, bended and/or shaped in the length direction such that the light guide is not a straight, linear bar or rod, but may comprise, for example, a rounded corner in the form of a 90 or 180 degrees bend, a U-shape, a circular or elliptical shape, a loop or a 3-dimensional spiral shape having multiple loops. This provides for a compact light guide of which the total length, along which generally the light is guided, is relatively large, leading to a relatively high lumen output, but can at the same time be arranged into a relatively small space. For example luminescent parts of the light guide may be rigid while transparent parts of the light guide are flexible to provide for the shaping of the light guide along its length direction. The light sources may be placed anywhere along the length of the folded, bended and/or shaped light guide.

Hence, in an embodiment the light guide comprises a plurality (n) faces, with n≥2, wherein at least part of a first face is configured as first light incoupling area and second light incoupling area, and wherein at least part of a second face is configured as light exit window. However, alternatively more faces may be used to couple light into the light guide and/or or more faces may be used to couple light out of the light guide. Hence, the lighting device, especially the light guide, may comprise a plurality of light exit windows. Also in such embodiment, the light sources are configured to provide at least two, and especially more light incoupling areas at different distances from one or more of such light exit windows. Hence, the spectral distribution of the light coupling out from each light exit window may be controlled by the control unit.

Parts of the light guide that are not used as light incoupling area or light exit window may be provided with a reflector. Hence, in an embodiment the lighting device further comprises a reflector configured to reflect luminescent material light back into the light guide. Therefore, the lighting device may further include one or more reflectors, especially configured to reflect radiation back into the light guide that escapes from one or more other faces than the radiation exit face. Especially, a face opposite of the radiation exit face may include such reflector, though in an embodiment not in physical contact therewith. Hence, the reflectors may especially not be in physical contact with the light guide.

The light sources are configured to illuminate the respective light incoupling areas. Optionally, a plurality of light sources irradiate the same light incoupling area. As the light guide may include a plurality of faces, some light incoupling areas may be configured at different faces but nevertheless be arranged at the same distance from the light exit window.

The light exit window is a part of the light guide that is configured to allow light to escape from the light guide. Such escape from this part of the light guide may be promoted by the shape of the light guide and the presence of one or more reflectors at parts of the light guide where light could escape, but should especially not escape, and thus be reflected back into the light guide. Hence, the light exit window is configured for escape of the luminescent material light (see also below). However, the light sources and luminescent material (and its concentration in the light guide) may be chosen that a substantial part of the light source light may also escape from the light exit window. Hence, optionally the light exit window is configured for escape of both luminescent material light and light source light (and optionally further light source light). Hence, the phrase "for escape of the luminescent material light" does not exclude the escape of other light from this window. The light exit window may be a face or part of a face of the light guide. At the light exit window luminescent material light, and optionally (part of the) light source light may be coupled out from the light guide. The terms "coupling in" and similar terms and "coupling out" and similar terms indicate that light changes from medium (external from the light guide into the light guide, and vice versa, respectively). In general, the light exit window will be a face (or a part of a face), configured (substantially) perpendicular to one or more other faces of the waveguide. In general, the light guide will include one or more body axes (such as a length axis, a width axis or a height axis), with the exit window being configured (substantially) perpendicular to such axis. Hence, in general, the light incoupling areas will be configured (substantially) perpendicular to the light exit window. Therefore, especially the face comprising the light exit window does not comprise a light incoupling area.

The phrase "a reflector configured to reflect luminescent material light back into the light guide" and similar phrases may especially also include such reflector configured to reflect luminescent material light and light source light back into the light guide. The term "reflector" may also refer to a plurality of reflectors.

Further, the lighting device may include a heat sink configured to facilitate cooling of the solid state light source and/or luminescent concentrator. The heat sink may comprise or consist of copper, aluminum, silver, gold, silicon carbide, aluminum nitride, boron nitride, aluminum silicon carbide, beryllium oxide, silicon-silicon carbide, aluminum silicon carbide, copper tungsten alloys, copper molybdenum carbides, carbon, diamond, graphite, and combinations of two or more thereof.

The lighting device may further include one or more cooling elements configured to cool the light guide.

The light guide comprises a luminescent material. The term "luminescent material" may optionally refer to a plurality of luminescent materials. The light guide especially is a transparent light guide material, i.e. a transparent body. This facilitates the propagation of luminescent material light and light source light through the light guide. The light guide can be a luminescent material, such as e.g. a luminescent ceramic based on for instance a cerium containing garnet. However, the light guide may also comprise another transmissive material wherein the luminescent material is embedded, such as molecular dispersed. Hence, in an embodiment the light guide comprises a light guide material wherein the luminescent material is embedded.

As indicated above, the light guide may include for instance a luminescent ceramic. The light guide may also include a ceramic wherein a luminescent material is embedded. Hence, in an embodiment the light guide material comprises a ceramic material. However, the light guide may also comprise another material wherein luminescent material is comprised. For instance, in an embodiment the light guide material comprises a polymeric material. In a polymeric material luminescent material may be embedded as particles (such as when the luminescent material comprises inorganic particulate luminescent material) and/or the luminescent material may be molecular dispersed, such as in the case of an organic dye. Hence, in an embodiment the light guide material comprises a material selected from the group consisting of an inorganic material and a hybrid material having both inorganic and organic character.

In an embodiment, the light guide may especially comprise a single crystal or a ceramic. With such systems, the desired transparency can be obtained and reflection at grain boundaries or imperfections can be reduced. In yet another embodiment, the light guide comprises a glass or a polymer. Especially in case of organic luminescent materials and/or quantum dot based luminescent materials, it may be desirable to use a glass, such as a low melting glass, or a polymer. The luminescent material is distributed over the light guide. Hence, the luminescent material is embedded in the light guide, or doped in the light guide, or solved in the light guide, or dispersed in the light guide. The luminescent material may also be part of a larger structure, such a crystalline host. This crystalline host may be dispersed in the light guide (or may be used as such, see also below).

Further specific luminescent materials are described below, but especially, the light guide may comprise a cerium doped garnet of the $A_3B_5O_{12}$ type. This garnet can be used as light guide, or can be embedded in a light guide, e.g. of a similar material. These types of garnets can be provided as single crystal and can also be well provided as ceramic material of a high quality. Cerium, the luminescent material, provides upon excitation with blue and/or UV radiation in these materials a green-orange luminescence, depending upon the type of garnet and the cerium concentration. Hence, especially in these embodiments with the cerium doped garnet, the solid state light source is configured to irradiate the radiation input face of the light guide with one or more of UV and blue solid state light source radiation.

Especially, the luminescent material comprises one or more of an organic dye, quantum dots, and a luminescent ion based luminescent material. The luminescent material may especially comprise a luminescent ion element (such as cerium in the above example), a luminescent molecule (dye), or luminescent quantum dot, etc. Examples are further defined below. The luminescent material absorbs at least part of the radiation of the light source and converts this radiation into luminescent material radiation (i.e. wavelength conversion). This luminescent material radiation may escape from the light guide (especially at the radiation exit face). However, optionally this luminescent material radiation is converted by another element distributed in the light guide, which converts the luminescent material radiation into other luminescence (secondary luminescent material radiation). In such an embodiment, the luminescent material radiation may be used as sensitizer. Herein, the invention is especially described in relation to a luminescent material that provides the radiation that is desired to escape from the light guide. Of course, the radiation escaping from the light guide may also again be converted, when desired (e.g. with the addition of a phosphor wheel).

As known in the art, one can define the (normalized) spectral overlap SO as:

$$SO = \frac{\int_{\lambda_x}^{\lambda_y} I(\lambda)\varepsilon(\lambda)d\lambda}{\int_{\lambda_x}^{\lambda_y} I(\lambda)d\lambda \; \varepsilon_{max}}$$

wherein $I(\lambda)$ is the intensity of the emission spectrum of the luminescent material (especially measured at a low absorbance, see also below) as a function of the wavelength, and $\varepsilon(\lambda)$ is the extinction coefficient of the luminescent material as a function of wavelength based on the excitation spectrum, wherein $\varepsilon_{max}$ is the maximum extinction coefficient in the wavelength range of 350-900 nm (i.e. $\lambda_x$-$\lambda_y$), based on the excitation spectrum, and wherein $\lambda_x$ and $\lambda_y$ define the wavelength range of 350-900 nm. For instance, the normalized spectral overlap may be 0.35 or less, such as in the range of 0.1-0.3. Especially, the above equation is applied for the wavelength range(s) of 400-900 nm (i.e. $\lambda_x$=400 and $\lambda_y$=900 nm). Especially, the emission spectrum and excitation spectrum are normalized.

In a specific embodiment, the spectral distribution of the light source light of the source of light and the excitation spectrum of the luminescent material have a (normalized) spectral overlap SO in the range of 0<SO≤0.5, such as 0.01≤SO≤0.5. For reabsorption it is desirable that there is some spectral overlap between the excitation and the emission, though especially there is no 100% overlap, as this may lead to a lower efficiency than desired. Hence, in a specific embodiment the luminescent material has an emission spectrum and an excitation spectrum having spectral overlap, wherein in the range of SO in the range of 0.02<SO≤0.5 such as SO in the range of 0.05<SO≤0.5, of the emission spectrum overlaps with the excitation spectrum, as best results are obtained when the excitation spectrum and emission spectrum partly overlap. The radiation of the solid state light source excites the luminescent material, which provides in its turn the converter element radiation or emission. Hence, in an embodiment the luminescent material comprises a radiation excitation spectrum and a radiation emission spectrum that spectrally partly overlap. Especially, there is no total overlap (such as in the case of a zero Stokes shift), as it is desirable that the reabsorption process is not "infinite". Hence, especially the spectral overlap SO is in the range of 0.02<SO≤0.5, especially 0.1<SO≤0.25. Even more especially, the spectral overlap SO is in the range of 0.1<SO≤0.5 (within the visible wavelength range), 0.1<SO≤0.25.

Some examples of suitable luminescent materials that may be used (option in a combination of two or more) are further described below.

The light guides as set forth below according to embodiments of the invention may comprise a suitable luminescent material for converting the light to another spectral distribution. Suitable luminescent materials include inorganic phosphors, such as doped YAG, LuAG, organic phosphors, organic fluorescent dyes and quantum dots, etc., which are highly suitable for the purposes of embodiments of the present invention as set forth below.

Suitable materials for the light guides as set forth below according to embodiments of the invention are sapphire, polycrystalline alumina and/or undoped transparent garnets such as YAG, LuAG having a refractive index in the range of n=1.7-1.8. An additional advantage of this material (above e.g. glass) is that it has a good thermal conductivity, thus diminishing local heating. Other suitable materials include, but are not limited to, glass, quartz and transparent polymers. In other embodiments the light guide material is lead glass. Lead glass is a variety of glass in which lead replaces the calcium content of a typical potash glass and in this way the refractive index can be increased. Ordinary glass has a refractive index of n=1.5, while the addition of lead produces a refractive index ranging up to 1.7.

An example of a suitable luminescent material that can be used in the light guide to provide the luminescent material is $Lu_3Al_5O_{12}$:Ce. Here, the lowest excitation band and the emission band partly overlap. Hence, especially a luminescent material is chosen that shows in the light guide (material) an overlap of the emission (spectrum) with the excitation (spectrum). Even more especially, the luminescent material has an emission spectrum (induced by excitation with the solid state light source radiation) and an excitation spectrum (of said emission or luminescent material radiation), wherein 5-25% of the emission spectrum overlaps with the excitation spectrum (i.e. SO is 0.05-0.25). The spectral overlap can be determined by normalizing the excitation spectrum and emission spectrum, especially in the visible range, and defining the area under the emission curve overlapping with the area under the excitation curve. The excitation spectrum is especially the excitation spectrum at the wavelength of maximum emission (i.e. one records the excitation spectrum with a detector measuring the emission at a fixed wavelength, especially the wavelength where the emission is maximum, as known to a person skilled in the art). Further, as the excitation spectrum and especially the emission spectrum may (slightly) depend upon the concentration, the relevant excitation spectrum and emission spectrum are those of the luminescent material embedded in the light guide at the herein indicated concentration (while especially monitoring or measuring the emission escaping from the radiation input face, as some emission may also escape from this face).

Quantum dots are small crystals of semiconducting material generally having a width or diameter of only a few nanometers. When excited by incident light, a quantum dot emits light of a color determined by the size and material of the crystal. Light of a particular color can therefore be produced by adapting the size of the dots. Most known quantum dots with emission in the visible range are based on cadmium selenide (CdSe) with a shell such as cadmium sulfide (CdS) and zinc sulfide (ZnS). Cadmium free quantum dots such as indium phosphide (InP), and copper indium sulfide ($CuInS_2$) and/or silver indium sulfide ($AgInS_2$) can also be used. Quantum dots show a very narrow emission band and thus they show saturated colors. Furthermore the emission color can easily be tuned by adapting the size of the quantum dots. Any type of quantum dot known in the art may be used in embodiments of the present invention as set forth below. However, it may be preferred for reasons of environmental safety and concern to use cadmium-free quantum dots or at least quantum dots having very low cadmium content.

The term "quantum dots" or "luminescent quantum dots" may also refer to a combination of different type of quantum dots, i.e. quantum dots that have different spectral properties. The QDs are herein also indicated as "wavelength converter nanoparticles". The term "quantum dots" especially refer to quantum dots that luminescence in one or more of the UV, visible and IR (upon excitation with suitable radiation, such as UV radiation).

The quantum dots or luminescent nanoparticles, which are herein indicated as wavelength converter nanoparticles, may for instance comprise group II-VI compound semiconductor quantum dots selected from the group consisting of (core-shell quantum dots, with the core selected from the group consisting of) CdS, CdSe, CdTe, ZnS, ZnSe, ZnTe, HgS, HgSe, HgTe, CdSeS, CdSeTe, CdSTe, ZnSeS, ZnSeTe, ZnSTe, HgSeS, HgSeTe, HgSTe, CdZnS, CdZnSe, CdZnTe, CdHgS, CdHgSe, CdHgTe, HgZnS, HgZnSe, HgZnTe, CdZnSeS, CdZnSeTe, CdZnSTe, CdHgSeS, CdHgSeTe, CdHgSTe, HgZnSeS, HgZnSeTe and HgZnSTe. In another embodiment, the luminescent nanoparticles may for instance be group III-V compound semiconductor quantum dots selected from the group consisting of (core-shell quantum dots, with the core selected from the group consisting of) GaN, GaP, GaAs, AlN, AlP, AlAs, InN, InP, InGaP, InAs, GaNP, GaNAs, GaPAs, AlNP, AlNAs, AlPAs, InNP, InNAs, InPAs, GaAlNP, GaAlNAs, GaAlPAs, GaInNP, GaInNAs, GaInPAs, InAlNP, InAlNAs, and InAlPAs. In yet a further embodiment, the luminescent nanoparticles may for instance be I-III-VI2 chalcopyrite-type semiconductor quantum dots selected from the group consisting of (core-shell quantum dots, with the core selected from the group consisting of) $CuInS_2$, $CuInSe_2$, $CuGaS_2$, $CuGaSe_2$, $AgInS_2$, $AgInSe_2$, $AgGaS_2$, and $AgGaSe_2$. In yet a further embodiment, the luminescent nanoparticles may for instance be (core-shell quantum dots, with the core selected from the group consisting of) I-V-VI2 semiconductor quantum dots, such as selected from the group consisting of (core-shell quantum dots, with the core selected from the group consisting of) $LiAsSe_2$, $NaAsSe_2$ and $KAsSe_2$. In yet a further embodiment, the luminescent nanoparticles may for instance be core-shell quantum dots, with the core selected from the group consisting of) group (IV-VI compound semiconductor nano crystals such as SbTe. In a specific embodiment, the luminescent nanoparticles are selected from the group consisting of (core-shell quantum dots, with the core selected from the group consisting of) InP, $CuInS_2$, $CuInSe_2$, CdTe, CdSe, CdSeTe, $AgInS_2$ and $AgInSe_2$. In yet a further embodiment, the luminescent nanoparticles may for instance be one of the group (of core-shell quantum dots, with the core selected from the group consisting of) II-VI, III-V, I-III-V and IV-VI compound semiconductor nano crystals selected from the materials described above with inside dopants such as ZnSe:Mn, ZnS:Mn. The dopant elements could be selected from Mn, Ag, Zn, Eu, S, P, Cu, Ce, Tb, Au, Pb, Tb, Sb, Sn and Tl. Herein, the luminescent nanoparticles based luminescent material may also comprise different types of QDs, such as CdSe and ZnSe:Mn.

It appears to be especially advantageous to use II-VI quantum dots. Hence, in an embodiment the semiconductor based luminescent quantum dots comprise II-VI quantum dots, especially selected from the group consisting of (core-shell quantum dots, with the core selected from the group consisting of) CdS, CdSe, CdTe, ZnS, ZnSe, ZnTe, HgS, HgSe, HgTe, CdSeS, CdSeTe, CdSTe, ZnSeS, ZnSeTe, ZnSTe, HgSeS, HgSeTe, HgSTe, CdZnS, CdZnSe, CdZnTe, CdHgS, CdHgSe, CdHgTe, HgZnS, HgZnSe, HgZnTe, CdZnSeS, CdZnSeTe, CdZnSTe, CdHgSeS, CdHgSeTe, CdHgSTe, HgZnSeS, HgZnSeTe and HgZnSTe, even more especially selected from the group consisting of CdS, CdSe, CdSe/CdS and CdSe/CdS/ZnS.

In an embodiment, nanoparticles can comprise semiconductor nanocrystals including a core comprising a first semiconductor material and a shell comprising a second semiconductor material, wherein the shell is disposed over at least a portion of a surface of the core. A semiconductor nanocrystal including a core and shell is also referred to as a "core/shell" semiconductor nanocrystal. Any of the materials indicated above may especially be used as core. Therefore, the phrase "core-shell quantum dots, with the core selected from the group consisting of" is applied in some of the above lists of quantum dot materials. The term "core-shell" may also refer to "core-shell-shell", etc., including gradient alloy shell, or dots in rods, etc. Examples of semiconductor nanocrystal (core)shell materials include, without limitation: red (e.g., (CdSe)ZnS (core)shell), green (e.g., (CdZnSe)CdZnS (core)shell, etc.), and blue (e.g., (CdS)CdZnS (core)shell; see further also above for examples of specific wavelength converter nanoparticles, based on semiconductors).

In an embodiment, semiconductor nanocrystals preferably have ligands attached thereto, such as e.g. described in WO 2011/031871. In an embodiment, the ligands can be derived from the coordinating solvent used during the growth process. In an embodiment, the surface can be modified by repeated exposure to an excess of a competing coordinating group to form an overlayer.

Organic fluorescent dyes can be used as well. The molecular structure can be designed such that the spectral peak position can be tuned. Examples of suitable organic fluorescent dyes materials are organic luminescent materials based on perylene derivatives, for example compounds sold under the name Lumogen® by BASF. Examples of suitable compounds include, but are not limited to, Lumogen® Red F305, Lumogen® Orange F240, Lumogen® Yellow F083, and Lumogen® F170.

Relevant examples of organic luminescent materials are e.g. perylenes (such as luminescent materials known under their trade name Lumogen from the company BASF, Ludwigshafen, Germany: Lumogen F240 Orange, Lumogen F300 Red Lumogen F305 Red, Lumogen F083 Yellow, Lumogen F170 Yellow, Lumogen F850 Green), Yellow 172 from the company Neelikon Food Dyes & Chemical Ltd., Mumbai, India, India, and luminescent materials such as coumarins (for example Coumarin 6, Coumarin 7, Coumarin 30, Coumarin 153, Basic Yellow 51), napthalimides (for example Solvent Yellow 11, Solvent Yellow 116), Fluorol 7GA, pyridines (for example pyridine 1), pyrromethenes (such as Pyrromethene 546, Pyrromethene 567), uranine, rhodamines (for example Rhodamine 110, Rhodamine B, Rhodamine 6G, Rhodamine 3B, Rhodamine 101, Sulphorhodamine 101, Sulphorhodamine 640, Basic Violet 11, Basic Red 2), cyanines (for example phthalocyanine, DCM), stilbenes (for example Bis-MSB, DPS), available from many traders. Several other luminescent materials, such as acid dyes, basic dyes, direct dyes and dispersion dyes may be used as long as they show a sufficiently high fluorescence quantum yield for the intended use. Organic materials of special interest that may be applied comprise for instance BASF Lumogen 850 for green luminescence, BASF Lumogen F083 or F170 for yellow luminescence, BASF Lumogen F 240 for orange luminescence, and BASF Lumogen F 300 or F305 for red luminescence.

Such organic luminescent material is especially embedded in a matrix, thereby forming the light guide. The matrix may especially comprise an aromatic polyester, or a copolymer thereof, such as e.g. polycarbonate (PC), poly (methyl)methacrylate (P(M)MA), polyglycolide or polyglycolic acid (PGA), polylactic acid (PLA), polycaprolactone (PCL), polyethylene adipate (PEA), polyhydroxy alkanoate (PHA), polyhydroxy butyrate (PHB), poly(3-hydroxybutyrate-co-3-hydroxyvalerate) (PHBV), polyethylene terephthalate (PET), polybutylene terephthalate (PBT), polytrimethylene terephthalate (PTT), polyethylene naphthalate (PEN); especially, the matrix may comprise polyethylene terephthalate (PET). Further, as will also be elucidated below the matrix may comprise a further luminescent material embedded in the matrix. However, (PETG) (glycol modified polyethylene terephthalate), PDMS (polydimethylsiloxane), COC (cyclo olefin copolymer) PE (polyethylene), or PP (polypropylene) may also be applied as matrix. Hence, the matrix is especially a polymeric matrix.

The luminescent material may also be an inorganic phosphor. Examples of inorganic phosphor materials include, but are not limited to, cerium (Ce) doped YAG ($Y_3Al_5O_{12}$) or LuAG ($Lu_3Al_5O_{12}$). Ce doped YAG emits yellowish light, whereas Ce doped LuAG emits yellow-greenish light. Examples of other inorganic phosphors materials which emit red light may include, but are not limited to ECAS and BSSN; ECAS being $Ca_{1-x}AlSiN_3$:$Eu_x$ wherein $0<x\leq1$, in other embodiments $0<x\leq0.2$; and BSSN being $Ba_{2-x-z}M_xSi_{5-y}Al_yN_{8-y}O_y$:$Eu_z$ wherein M represents Sr or Ca, $0\leq x\leq1$, $0<y\leq4$, and $0.0005\leq z\leq0.05$, and in embodiments $0\leq x\leq0.2$.

In embodiments of the invention as set forth below, the luminescent material is made of material selected from the group comprising $(M<I>_{(1-x-y)} M<II>_x M<III>_y)_3 (M<IV>_{1-z} M<V>_z)_5O_{12}$ where M<I> is selected from the group comprising Y, Lu or mixtures thereof, M<II> is selected from the group comprising Gd, Tb, La, Yb or mixtures thereof, M<III> is selected from the group comprising Tb (when M<II> is not Tb), Pr, Ce, Er, Nd, Eu or mixtures thereof, M<IV> is Al, M<V> is selected from the group comprising Ga, Sc or mixtures thereof, such as Ce doped Yttrium aluminum garnet (YAG, $\underline{Y_3Al_5O_{12}}$) and Ce doped Lutetium-Aluminum-Garnet (LuAG); and $0\leq x\leq1$, $0<y\leq0.1$, $0<z<1$, $(M<I>_{(1-x-y)} M<II>_x M<III>_y)_2O_3$ where M<I> is selected from the group comprising Y, Lu or mixtures thereof, M<II> is selected from the group comprising Gd, La, Yb or mixtures thereof, M<III> is selected from the group comprising Tb, Pr, Ce, Er, Nd, Eu, Bi, Sb or mixtures thereof; and $0<x\leq1$, $0<y\leq0.1$, $(M<I>_{(1-x-y)}M<II>_x M<III>_y) S_{(1-z)}Se$ where M<I> is selected from the group comprising Ca, Sr, Mg, Ba or mixtures thereof, M<II> is selected from the group comprising Ce, Eu, Mn, Tb, Sm, Pr, Sb, Sn or mixtures thereof, M<III> is selected from the group comprising K, Na, Li, Rb, Zn or mixtures thereof, and $0<x\leq0.01$, $0<y\leq0.05$, $0\leq z<1$; $(M<I>_{(1-x-y)} M<II>_x M<III>_y)O$ where M<I> is selected from the group comprising Ca, Sr, Mg, Ba or mixtures thereof, M<II> is selected from the group comprising Ce, Eu, Mn, Tb, Sm, Pr or mixtures thereof, M<III> is selected from the group comprising K, Na, Li, Rb, Zn or mixtures thereof, and $0<x\leq0.1$, $0<y\leq0.1$; $(M<I>_{(2-x)} M<II>_x M<III>_2)O_7$ where M<I> is selected from the group comprising La, Y, Gd, Lu, Ba, Sr or mixtures thereof, M<II> is selected from the group comprising Eu, Tb, Pr, Ce, Nd, Sm, Tm or mixtures thereof, M<III> is selected from the group comprising Hf, Zr, Ti, Ta, Nb or mixtures thereof, and $0<x\leq1$; $(M<I>_{(1-x)} M<II>_x M<III>_{(1-y)} M<IV>_y)O_3$ where M<I> is selected from the group comprising Ba, Sr, Ca, La, Y, Gd, Lu or mixtures thereof, M<II> is selected from the group comprising Eu, Tb, Pr, Ce, Nd, Sm, Tm or mixtures thereof, M<III> is selected from the group comprising Hf, Zr, Ti, Ta, Nb or mixtures thereof, and M<IV> is selected from the group comprising Al, Ga, Sc, Si or mixtures thereof, and $0<x\leq0.1$, $0<y\leq0.1$, or mixtures thereof.

Some specific inorganic luminescent materials are discussed hereafter. Several options for green emitters are possible, including one or more of $(Ca, Sr, Ba)(Al, Ga, In)_2(O, S, Se)_4$:$Eu^{2+}$, a thiogallate, especially such luminescent material at least comprising Sr, Ga and S, such as $SrGa_2S_4$: $Eu^{2+}$. These types of luminescent materials may especially be narrow band green emitters. Optionally or alternatively, the inorganic luminescent material may comprise a $M_3A_5O_{12}$:$Ce^{3+}$ (garnet material), wherein M is selected from the group consisting of Sc, Y, Tb, Gd, and Lu, wherein A is selected from the group consisting of Al and Ga. Preferably, M at least comprises one or more of Y and Lu, and wherein A at least comprises Al. These types of materials may give highest efficiencies. Embodiments of garnets especially include $M_3A_5O_{12}$ garnets, wherein M comprises at least yttrium or lutetium and wherein A comprises at least aluminum. Such garnet may be doped with cerium (Ce), with praseodymium (Pr) or a combination of cerium and praseodymium; especially however with at least Ce. Especially, A comprises aluminum (Al), however, A may also partly comprise gallium (Ga) and/or scandium (Sc) and/or indium (In), especially up to about 20% of Al, more especially up to about 10% of Al (i.e. the A ions essentially consist of 90 or more mole % of Al and 10 or less mole % of one or more of Ga, Sc and In); A may especially comprise up to about 10% gallium. In another variant, A and O may at least partly be replaced by Si and N. The element M may especially be selected from the group consisting of yttrium (Y), gadolinium (Gd), terbium (Tb) and lutetium (Lu). Further, Gd and/or Tb are especially only present up to an amount of about 20% of M. In a specific embodiment, the garnet luminescent material comprises $(Y_{1-x}Lu_x)_3Al_5O_{12}$: Ce, wherein x is equal to or larger than 0 and equal to or smaller than 1. The term ":Ce" or ":$Ce^{3+}$", indicates that part of the metal ions (i.e. in the garnets: part of the "M" ions) in the luminescent material is replaced by Ce. Especially a lutetium comprising garnet may provide the desired luminescence, especially when lutetium is at least 50% of M. Additionally or alternatively, the inorganic luminescent material may also comprise a luminescent material selected from the group consisting of divalent europium containing nitride luminescent material or a divalent europium containing oxonitride luminescent material, such as one or more materials selected from the group consisting of (Ba, Sr, Ca)S:Eu, (Mg, Sr, Ca)AlSiN₃:Eu and (Ba, Sr, Ca)₂Si₅N₈:Eu. In these compounds, europium (Eu) is substantially or only divalent, and replaces one or more of the indicated divalent cations. In general, Eu will not be present in amounts larger than 10% of the cation, especially in the range of about 0.5-10%, more especially in the range of about 0.5-5% relative to the cation(s) it replaces. The term ":Eu" or ":$Eu^{2+}$", indicates that part of the metal ions is replaced by Eu (in these examples by $Eu^{2+}$). For instance, assuming 2% Eu in $CaAlSiN_3$:Eu, the correct formula could be $(Ca_{0.98}Eu_{0.02})AlSiN_3$. Divalent europium will in general replace divalent cations, such as the above divalent alkaline earth cations, especially Ca, Sr or Ba. The material (Ba, Sr, Ca)S:Eu can also be indicated as MS:Eu, wherein M is one or more elements selected from the group consisting of barium (Ba), strontium (Sr) and calcium (Ca); especially, M comprises in this compound calcium or strontium, or calcium and strontium, more especially calcium. Here, Eu is introduced and replaces at least part of M (i.e. one or more of Ba, Sr, and Ca). Further, the material (Ba, Sr, Ca)₂Si₅N₈: Eu can also be indicated as $M_2Si_5N_8$:Eu, wherein M is one or more elements selected from the group consisting of barium (Ba), strontium (Sr) and calcium (Ca); especially, M comprises in this compound Sr and/or Ba. In a further specific embodiment, M consists of Sr and/or Ba (not taking into account the presence of Eu), especially 50-100%, especially 50-90% Ba and 50-0%, especially 50-10% Sr, such as $Ba_{1.5}Sr_{0.5}Si_5N_8$:Eu, (i.e. 75% Ba; 25% Sr). Here, Eu is introduced and replaces at least part of M i.e. one or more of Ba, Sr, and Ca). Likewise, the material (Ba, Sr, Ca)AlSiN₃:Eu can also be indicated as MAlSiN₃:Eu wherein M is one or more elements selected from the group consisting of barium (Ba), strontium (Sr) and calcium (Ca); especially, M comprises in this compound calcium or strontium, or calcium and strontium, more especially calcium. Here, Eu is introduced and replaces at least part of M (i.e. one or more of Ba, Sr, and Ca). Preferably, in an embodiment the inorganic luminescent material comprises (Ca, Sr, Mg)AlSiN$_3$:Eu, preferably CaAlSiN$_3$:Eu. Further, in another embodiment, which may be combined with the former, the inorganic luminescent material comprises (Ca, Sr, Ba)$_2$Si$_5$N$_8$:Eu, preferably (Sr, Ba)$_2$Si$_5$N$_8$:Eu. The terms "(Ca, Sr, Ba)" indicate that the corresponding cation may be occupied by calcium, strontium or barium. It also indicates that in such material corresponding cation sites may be occupied with cations selected from the group consisting of calcium, strontium and barium. Thus, the material may for instance comprise calcium and strontium, or only strontium, etc.

The inorganic luminescent material may also comprise one or more luminescent materials selected from the group consisting of a trivalent cerium containing garnet (see above) and a trivalent cerium containing oxonitride. The oxonitride materials are in the art often also indicated as oxynitride materials.

The term "inorganic luminescent material" may thus also relate to a plurality of different inorganic luminescent materials. The inorganic luminescent material may be comprised by the light converter, such as embedded in the matrix, like especially the organic luminescent material.

Combinations of two or more of such configurations are also possible (see also above). Hence, in an embodiment the (in)organic luminescent material, such as the quantum dot based luminescent material, is embedded (i.e. distributed) in the matrix. In other embodiments, especially in case of the inorganic luminescent materials, even more especially in the case of the garnet-based luminescent materials, such materials may be shaped into a (ceramic) light guide and may thus be used as such.

Many of the above-mentioned materials, especially the garnet materials, can be provided as ceramics (ceramic body or ceramic slab). The term "ceramic" especially relates to an inorganic material that is obtainable by heating a (poly crystalline) powder, like at least 500° C., especially at least 800° C., such as at least 1000° C., under high pressure, such as at least 0.5 MPa, like especially at least 1 MPa, like 1 to about 500 MPa, such as at least 5 MPa, or at least 10 MPa, especially under uniaxial or isostatic pressure, especially under isostatic pressure. A specific method to obtain a ceramic is hot isostatic pressing (HIP), whereas the HIP process may be a post-sinter HIP, capsule HIP or combined sinter-HIP process, like under the temperature and pressure conditions as indicate above. The ceramic obtainable by such method may be used as such, or may be further processed (like polishing, or even processing into particles again). A ceramic especially has density that is at least 90%, such as at least 95%, like in the range of 97-100%, of the theoretical density (i.e. the density of a single crystal). A ceramic may still be polycrystalline, but with a reduced, or strongly reduced volume between grains (pressed particles or pressed agglomerate particles).

The light guide without the luminescent material will in general be highly transmissive (especially transparent), like a single crystal, a polymeric material or a ceramic material. The transmission may be close to 100%. With the luminescent material however, at least part of the radiation is strongly absorbed. For this radiation absorbed by the luminescent material, the light guide including the luminescent material is hardly transmissive. The term "transmissive" herein may especially refer to a converter that has a light transmission in the range of 90-100%, such as 95-100%, for light having a wavelength selected from the visible wavelength range. Herein, the term "visible light" especially relates to light having a wavelength selected from the range of 380-780 nm. The transmission can be determined by providing light at a specific wavelength with a first intensity to the light guide under perpendicular radiation and relating the intensity of the light at that wavelength measured after transmission through the material, to the first intensity of the light provided at that specific wavelength to the material (see also E-208 and E-406 of the CRC Handbook of Chemistry and Physics, 69th edition, 1088-1989). The light guides may comprise, or essentially consist of, one or more materials that are highly transparent, and would have a transmission (through the width W of the light guide) for the solid state light source radiation of 90% or more especially 95% or more, even more especially 98% or more, even more especially 99% or more, in the absence of the luminescent material.

The light guides as set forth below according to embodiments of the invention may comprise regions with a different density of suitable luminescent material for converting the light to another spectral distribution. In an embodiment a transparent light guide comprises two parts adjacent to each other and only one of which comprises a luminescent material and the other part is transparent or has a relatively low concentration of luminescent material. In another embodiment the light guide comprises yet another, third part, adjacent to the second part, which comprises a different luminescent material or a different concentration of the same luminescent material. The different parts may be integrally formed thus forming one piece or one light guide. Would such embodiments be used, than the average concentration over the width is applied. For instance, assume a light guide with two layers, with the first concentration in a first layer being 2 and in a second layer being 0, then the average concentration is 1.

In general however, the concentration of the luminescent material in a single light guide is homogeneous(ly distributed), for instance with optionally local deviations within about 10% or less from an average concentration. Hence, especially the concentration of the luminescent material (or species) within a single light guide is substantially homogeneously distributed within the light guide.

In yet a further aspect, the invention provides a lighting unit configured to provide visible light, wherein the lighting unit comprises at least one lighting device as defined herein. For instance, such lighting unit may also comprise one or more (additional) optical elements, like one or more of optical filters, collimators, reflectors, wavelength converters, etc. The lighting unit may be, for example, a lighting unit for use in an automatic application, like a headlight. Hence, the invention also provides an automotive lighting unit configured to provide visible light, wherein the automotive lighting unit comprises at least one lighting device as defined herein and/or a digital projector unit comprising at least one lighting device as defined herein. Especially, the lighting device may be configured (in such applications) to provide green light or red light. In a specific embodiment, such lighting unit comprises at least a first lighting device configured to provide green light and at least a second lighting device configured to provide red light. Blue light may e.g. be provided by the same solid state light sources, but without use of the luminescent concentrator. In this way, e.g. white light may be provided. Alternatively or additionally, blue radiation may be generated with the concentrator. In such instance, the solid state light source is especially configured to provide radiation having a wavelength at 420 nm or below, such as 410 nm or below, like 400 nm or below, like 390 nm or below, especially in the (near) UV and the luminescent material is configured to absorb at least part of this radiation and convert it into blue luminescent material radiation.

In yet a further aspect, the invention relates to the use of a difference in position of light incoupling areas when illuminating a light guide comprising a luminescent material with a plurality of light sources configured to provide light source light, wherein the light source light of the plurality of light sources have spectral overlap, for controlling a spectral distribution of a luminescent material light of said luminescent material when emanating from a light exit window from said light guide.

The terms "upstream" and "downstream" relate to an arrangement of items or features relative to the propagation of the light from a light generating means (here the especially the first light source), wherein relative to a first position within a beam of light from the light generating means, a second position in the beam of light closer to the light generating means is "upstream", and a third position within the beam of light further away from the light generating means is "downstream".

The lighting device may be part of or may be applied in e.g. office lighting systems, household application systems, shop lighting systems, home lighting systems, accent lighting systems, spot lighting systems, theater lighting systems, fiber-optics application systems, projection systems, self-lit display systems, pixelated display systems, segmented display systems, warning sign systems, healthcare/medical lighting application systems, indicator sign systems, decorative lighting systems, portable systems, automotive applications, green house lighting systems, horticulture lighting, or LCD backlighting.

The term white light herein, is known to the person skilled in the art. It especially relates to light having a correlated color temperature (CCT) between about 2000 and 20000 K, especially 2700-20000 K, for general lighting especially in the range of about 2700 K and 6500 K, and for backlighting purposes especially in the range of about 7000 K and 20000 K, and especially within about 15 SDCM (standard deviation of color matching) from the BBL (black body locus), especially within about 10 SDCM from the BBL, even more especially within about 5 SDCM from the BBL.

In an embodiment, the light source may also provide light source light having a correlated color temperature (CCT) between about 5000 and 20000 K, e.g. direct phosphor converted LEDs (blue light emitting diode with thin layer of phosphor for e.g. obtaining of 10000 K). Hence, in a specific embodiment the light source is configured to provide light source light with a correlated color temperature in the range of 5000-20000 K, even more especially in the range of 6000-20000 K, such as 8000-20000 K. An advantage of the relative high color temperature may be that there may be a relative high blue component in the light source light.

The terms "violet light" or "violet emission" especially relates to light having a wavelength in the range of about 380-440 nm. The terms "blue light" or "blue emission" especially relates to light having a wavelength in the range of about 440-490 nm (including some violet and cyan hues). The terms "green light" or "green emission" especially relate to light having a wavelength in the range of about 490-560 nm. The terms "yellow light" or "yellow emission" especially relate to light having a wavelength in the range of about 540-570 nm. The terms "orange light" or "orange emission" especially relate to light having a wavelength in the range of about 570-600. The terms "red light" or "red emission" especially relate to light having a wavelength in the range of about 600-750 nm. The term "pink light" or "pink emission" refers to light having a blue and a red component. The terms "visible", "visible light" or "visible emission" refer to light having a wavelength in the range of about 380-750 nm.

The term "substantially" herein, such as in "substantially all light" or in "substantially consists", will be understood by the person skilled in the art. The term "substantially" may also include embodiments with "entirely", "completely", "all", etc. Hence, in embodiments the adjective substantially may also be removed. Where applicable, the term "substantially" may also relate to 90% or higher, such as 95% or higher, especially 99% or higher, even more especially 99.5% or higher, including 100%. The term "comprise" includes also embodiments wherein the term "comprises" means "consists of". The term "and/or" especially relates to one or more of the items mentioned before and after "and/or". For instance, a phrase "item 1 and/or item 2" and similar phrases may relate to one or more of item 1 and item 2. The term "comprising" may in an embodiment refer to "consisting of" but may in another embodiment also refer to "containing at least the defined species and optionally one or more other species".

Furthermore, the terms first, second, third and the like in the description and in the claims, are used for distinguishing between similar elements and not necessarily for describing a sequential or chronological order. It is to be understood that the terms so used are interchangeable under appropriate circumstances and that the embodiments of the invention described herein are capable of operation in other sequences than described or illustrated herein.

The devices herein are amongst others described during operation. As will be clear to the person skilled in the art, the invention is not limited to methods of operation or devices in operation.

It should be noted that the herein mentioned embodiments illustrate rather than limit the invention, and that those skilled in the art will be able to design many alternative embodiments without departing from the scope of the appended claims. In the claims, any reference signs placed between parentheses shall not be construed as limiting the claim. Use of the verb "to comprise" and its conjugations does not exclude the presence of elements or steps other than those stated in a claim. The article "a" or "an" preceding an element does not exclude the presence of a plurality of such elements. The invention may be implemented by means of hardware comprising several distinct elements, and by means of a suitably programmed computer. In the device claim enumerating several means, several of these means may be embodied by one and the same item of hardware. The mere fact that certain measures are recited in mutually different dependent claims does not indicate that a combination of these measures cannot be used to advantage.

The invention further applies to a device comprising one or more of the characterizing features described in the description and/or shown in the attached drawings. The invention further pertains to a method or process comprising one or more of the characterizing features described in the description and/or shown in the attached drawings.

The various aspects discussed in this patent can be combined in order to provide additional advantages. Furthermore, some of the features can form the basis for one or more divisional applications.

BRIEF DESCRIPTION OF THE DRAWINGS

Embodiments of the invention will now be described, by way of example only, with reference to the accompanying schematic drawings in which corresponding reference symbols indicate corresponding parts, and in which:

FIGS. 2a-2h schematically depict some aspects of the invention.

The drawings are not necessarily on scale.

DETAILED DESCRIPTION OF THE EMBODIMENTS

Figure 1A:
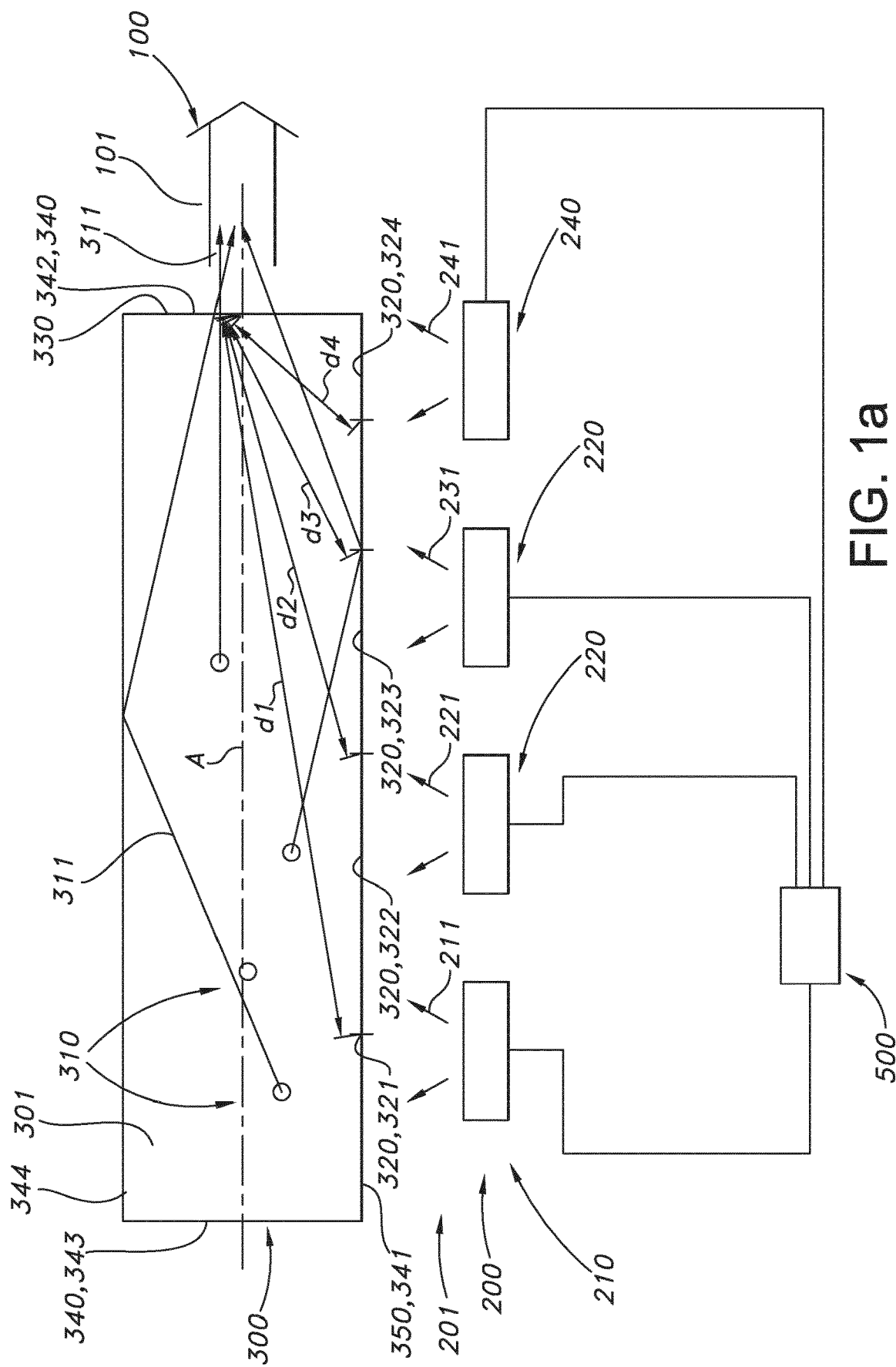
FIGS. 1a-1d schematically depict some aspects of the invention.

FIG. 1a schematically depicts an embodiment of a lighting device 100 configured to provide lighting device light 101. The lighting device 100 comprises a plurality m (here by way of example m=4) of light sources 200 configured to provide light source light 201. The plurality m of light sources 200 comprises at least a first light source 210 configured to generate first light source light 211 and a second light source 220 configured to generate second light source light 221, (and in this example also a third light source 230 configured to generate third light source light 231 and a fourth light source 240 configured to generate fourth light source light 241.

Phrases like light "light source 210, 220, . . . " and similar phrases, such as "light source light 211, 221, . . . " or "distance d1, d2, . . . " are used to indicate plurality of items or references. For instance, five light sources would provide light sources 210, 220, 230, 240, and 250, and in these cases also light source light 211, 221, 321, 421, 521, and, dependent upon the arrangement of the light sources also five distances d1, d2, d3, d4, and d5. Note that the term "plurality" always indicates at least two. Hence, herein the basic definitions of pluralities of references in general indicate at least two numbers (such as "a plurality of light sources 210, 220, . . . ", etc.).

The light source may in principle be any type of point light source, but is in an embodiment a solid state light source such as a Light Emitting Diode (LED), a Laser Diode or Organic Light Emitting Diode (OLED), a plurality of LEDs or Laser Diodes or OLEDs or an array of LEDs or Laser Diodes or OLEDs, or a combination of any of these. The LED may in principle be an LED of any color, or a combination of these, but is in an embodiment a blue light source producing light source light in the blue color-range which is defined as a wavelength range of between 380 nm and 495 nm. In another embodiment, the light source is an UV or violet light source, i.e. emitting in a wavelength range of below 420 nm.

Further, the lighting device 100 comprises a light guide 300 comprising a luminescent material 310 excitable by the light source light 201, and configured to provide luminescent material light 311. As indicated above, the luminescent material 310 in the light guide 300 is configured to reabsorb at least part of its luminescent material light 311. The extent of reabsorption may depend upon the type of luminescent material (Stokes shift) and also the concentration of the luminescent material or luminescent species in the light guide (material). The light guide material is indicated with reference 301.

The light guide 300 comprises a light exit window 330 (here second face 342, see also below) for escape (or outcoupling) of the luminescent material light 311 from the light guide 300 and a plurality of light incoupling areas 320 comprising at least a first light incoupling area 321 for receipt of first light source light 211 and configured at a first distance d1 from the light exit window 330, and a second light incoupling area 322 for receipt of the second light source light 21 and configured at a second distance d2 from the light exit window 330. Note that the first distance d1 is unequal to the second distance d2. Here, all four distances d1, d2, d3 and d4 are different. The light sources are thus arranged upstream of the light guide 300 and the light exit window 330 is arranged downstream from the light incoupling areas 320. Further optics may be available downstream of the light exit window 330, but these are not further discussed in detail. For instance, in an embodiment a total internal reflection (TIR) collimator or reflector can be applied. The light exit window (here second face 342) is configured (substantially) perpendicular to the first face 341, which comprises in this example a plurality of four light incoupling areas 320 (i.e. first-fourth light incoupling areas 321, 322, 323, 324).

The first light source 210 is configured to provide said first light source light 211 to the first light incoupling area 321, and the second light source 220 is configured to provide said second light source light 221 to the second light incoupling area 322. Likewise, this will in general be the case for any further light sources (such as 230, 240).

Further, the lighting device may include a control unit 500, for independently controlling each of the plurality of light sources 200. By this control, the color point and/or color temperature of the lighting device light 101 may be controlled (see also below). The lighting device light 101 at least comprises luminescent material light 311, but may optionally also comprise light source light 201 (from one or more of the light sources 200), e.g. blue light source light 201 and yellow luminescent material light 311 (making e.g. white light).

Hence, with the present invention, e.g. it may be possible to tune between cool white and warm white.

The light guide 300 in this embodiment comprises a plurality of faces (or surfaces) 340, such as the first face 341, which includes in this embodiment a plurality of light incoupling areas 320, a second face 342, which comprises the light exit window 311, and further faces 343 (third face) and 344 (fourth face), etc. Optionally, these faces may be used to couple light source light of other light sources into the light guide 300. Further, parts that are not used to couple light source light in or out may be provided with a reflector (see below). Hence, the light guide 300 comprises one or more faces 340, in general at least two faces 340 (e.g. a cone (not depicted) may be considered to have two faces, and a rod (see FIG. 2g) may be considered to have three faces).

Reference A indicates a body axis, such as in this case a length axis. In general, the light guide 300 will include one or more body axes (such as a length axis, a width axis or a height axis), with the exit window 330 being configured (substantially) perpendicular to such axis. Hence, in general, the light incoupling areas 340 will be configured (substantially) perpendicular to the light exit window 330.

In the schematic drawings, a power supply or other items are not shown in the drawings.

Figure 1B:
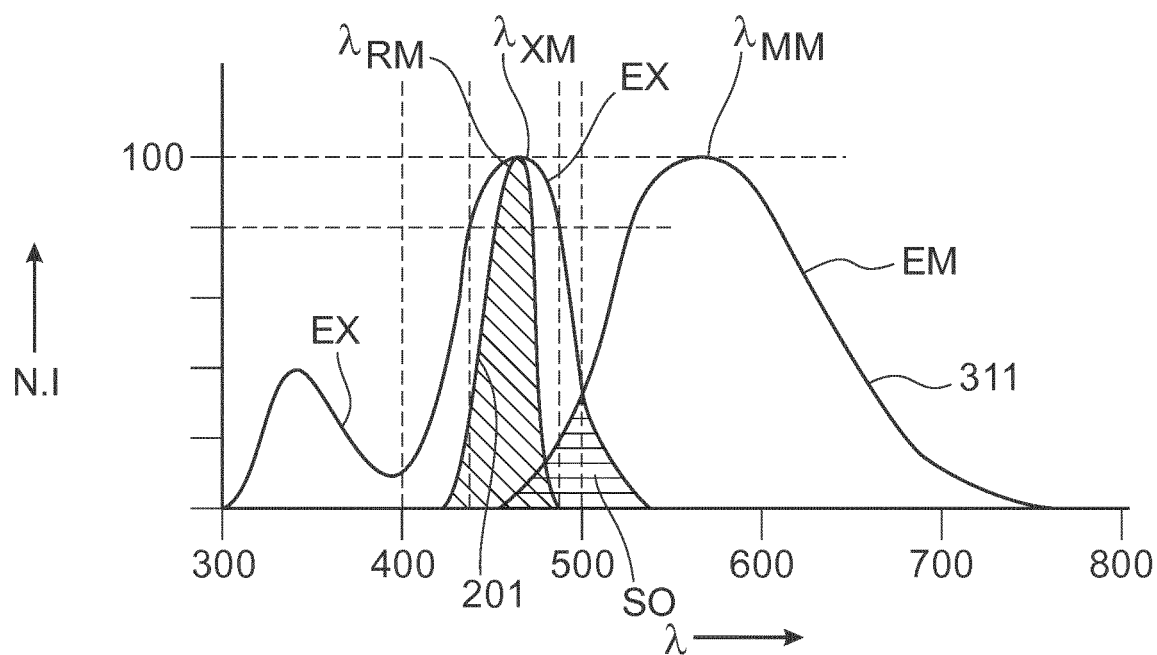

FIG. 1b schematically depicts an emission curve and associated excitation curve, with on the x-axis wavelength (λ) in nanometer (nm) and on the y-axis normalized intensity (N.I.) (in arbitrary units). For the sake of argument, the absorption curve is defined as being identical to the excitation curve, especially within the relevant wavelength range of 400-600, especially even 300-600 nm. The excitation or absorption curve is identified with reference EX. The emission curve is identified with reference EM, i.e. the radiation converter element radiation 311. Further, the (diagonally) hashed curve is the solid state light source radiation 21. The curves are normalized. It is apparent that the radiation converter element can be excited over nearly the whole wavelength range of 300-500 in this example. However, most efficient excitation will be in the range around the maximum $\lambda_{XM}$, i.e. the excitation maximum. The solid state light source radiation has a maximum at radiation maximum $\lambda_{RM}$. Especially, the solid state light source is chosen such that its radiation maximum $\lambda_{RM}$ is within the range of 70-100% of $\lambda_{XM}$. In the drawing, the 80-100% range is indicated. Here, in this embodiment the solid state light source radiation overlaps substantially completely with the excitation band, and the maxima $\lambda_{XM}$ and $\lambda_{RM}$ are substantially on top of each other. Further, the emission band and excitation band overlap. Here, in this schematic drawing about 10-15% of the emission band EM (radiation converter element radiation 311) overlaps with the excitation band. The spectral overlap is determined by normalizing the excitation spectrum and emission spectrum in the visible range to 100 (or 1, etc.), and defining the area under the emission curve overlapping with the area under the excitation curve. For a good reabsorption such overlap is beneficial. The overlapping area is (horizontally) hashed and is indicated with reference SO (spectral overlap). The wavelength at maximum emission is indicated with reference $\lambda_{MM}$. The wavelength difference between $\lambda_{XM}$ and $\lambda_{MM}$ is the Stokes shift. Note that in general each light source 200 (i.e. first light source 210, second light source 220, etc.) will generate light source light 201 (i.e. first light source light 211, second light source light 221, etc.) being substantially identical, i.e. all substantially having the same spectral distribution. Hence, referring to FIG. 1*a*, all four light sources 200 may generate the same light source emission 201.

For measuring an emission and excitation spectrum for estimating the spectral overlap, especially a very thin piece, such as less than 1 mm thick, like less than 0.5 mm thick, may be used. The thin part is irradiated with the excitation light and emission coming from the light incoupling area is measured. Also thicker pieces may be used. In such case, especially excitation is provided under a grazing angle, and emission light emanating from the light incoupling area is measured. In these ways, substantially only emission may be measured that has hardly (or not) been affected by reabsorption. Optionally, an identical light guide may be measured, but with a 100 times lower concentration of luminescent material (i.e. a much lower absorbance). Also this reduces self-absorption and may provide excitation and emission spectra for determining the spectral overlap. Yet another option is to convert (part of) the light guide into particulate material. This will substantially reduce self-absorption and lead to an emission spectrum that is not (substantially) affected by self-absorption. Alternatively, the emission spectra may be measured at different thicknesses (especially of a flat light guide). In this way, the emission spectrum at substantially no self-absorption may be extrapolated from these emissions at different thicknesses. A combination of these methods may also be used.

High brightness light sources are interesting for various applications including spots and digital light projection. For this purpose, but also for other purposes, it is possible to make use of so-called light concentrators where shorter wavelength light is converted to longer wavelengths in a highly transparent luminescent material. A rod of such a transparent luminescent material can be illuminated by LEDs to produce longer wavelengths within the rod. For various applications such as light engines, lamps, luminaires and projectors, one would like to control the color (temperature) of the light source e.g. for black body dimming (for mimicking the behavior of a light source such as an incandescent light source) or adapting the color gamut of a light system (for adjusting the color quality). This can be done by combining light emitted from multiple sources. However, use of multiple LEDs leads to the increase in the area of the emitting surface. It is therefore desired to control the color (temperature) of a light emitting surface without increasing the area so that the intensity remains high.

Figure 1C:
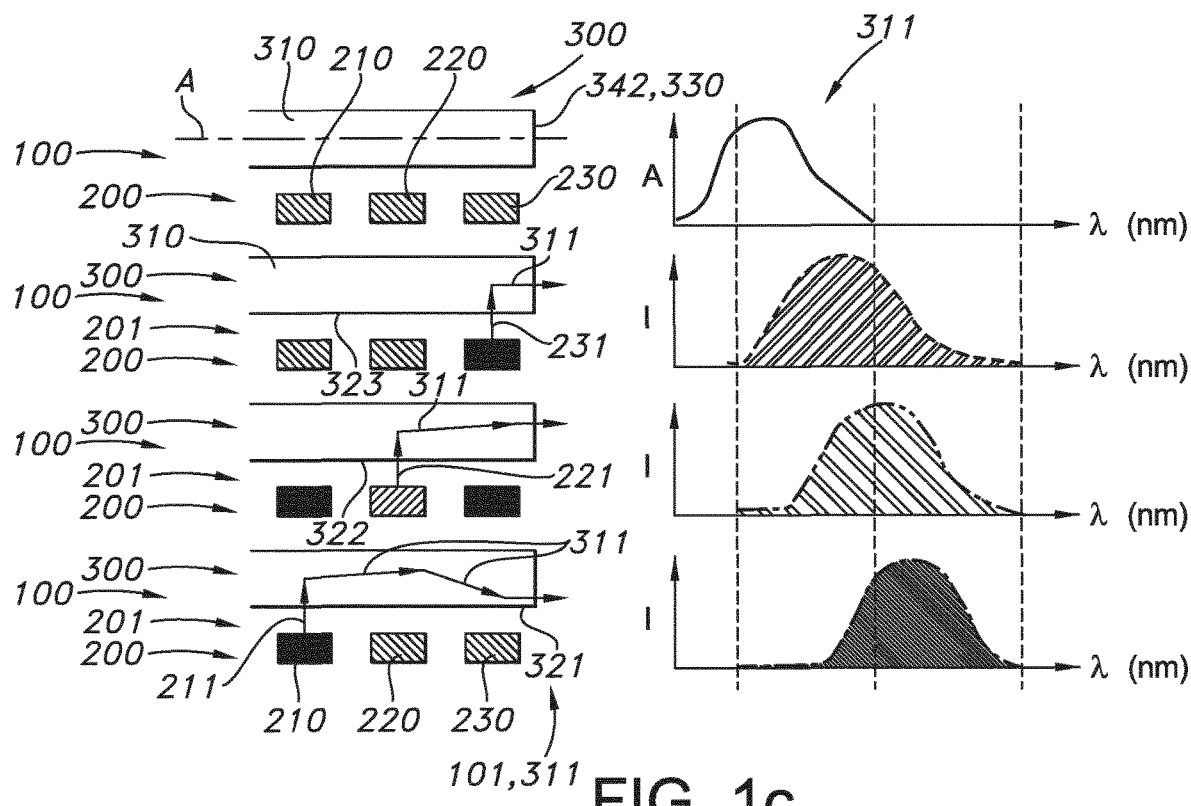
Figure 1D:
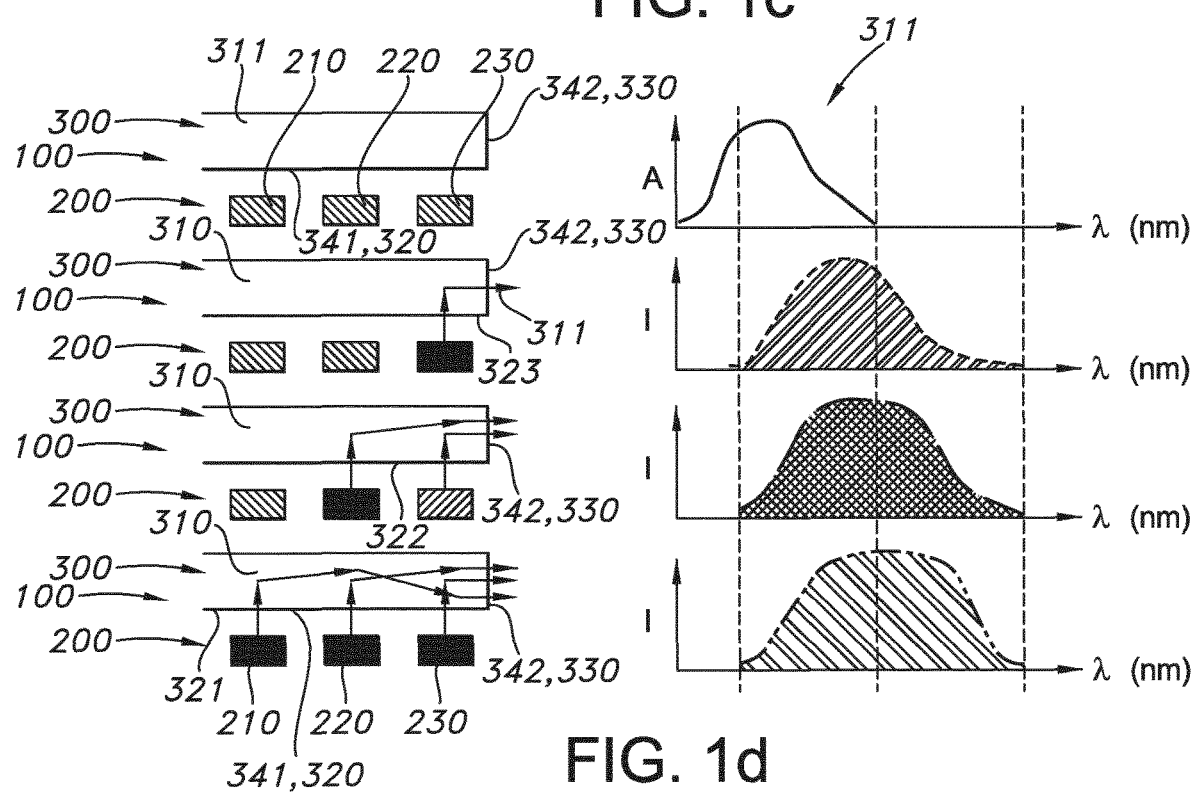

As indicated above we suggest the use of a luminescent concentrator based light source which is pumped by at least two light sources. The light concentrator is chosen that there is (preferably) a large overlap between the emission and absorption spectra. The large overlap leads to a strong re-absorption of light emitted by the luminescent concentrator and hence to a strong dependence of the end spectrum to the length of the luminescent rod. When such a rod is pumped from the sides with a number of LEDs along the length then the spectrum of the light emitted from the exit surface will depend on the position of the LED w.r.t the exit surface. Therefore, by choosing which LED or LEDs to switch on and adjusting their relative intensity, the color (temperature) of the light coming out of the exit surface can be adjusted (FIGS. 1*c*-1*d*). Thus, each LED will be controlled differently depending on the distance from, or position of the LED w.r.t., the exit surface and depending on the required color temperature of the light exiting the rod. The control unit takes into account the distance from each LED to the exit surface of the rod and controls each LED accordingly in order to provide for the required color temperature of the light exiting the rod. In the same way, by controlling the number of LEDs the peak width and/or shape can be adapted (FIG. 1*d*). The top curves in FIGS. 1*c* and 1*d* schematically depict an emission without substantial reabsorption. The second curves in FIGS. 1*c* and 1*d*, respectively, correspond to the irradiation by the third light source 230 only. By way of example, this curve is already a bit red shifted, indicative of some reabsorption. The third curve in FIG. 1*c* corresponds with the second light source 220 irradiating the light guide 300; the emission is more red shifted than the former, as the emission light 311 has to travel a longer path through the light guide 300. The lowest curve in FIG. 1*c* corresponds to the emission generated with the lighting device 100 when the first light source 210 irradiates the light guide 200. The emission is most redshifted. FIG. 1*d* shows that by choosing the light sources, not only the peak position can be tuned, but also the shape of the emission. When light sources at different distances are used (see the third and fourth curves wherein respectively the third light source 230 and the second light source 220, or all three light sources 230, 220, 210 irradiate the light guide 200), a superposition of the respective emissions may be obtained. Note that these graphs are schematical.

If desired, the light sources output may be adapted such that the total intensity escaping the light exit surface stays the same.

It goes without saying, that a plurality of LEDs can be used, such as 40 LED, or 2 rows of 20 LEDs, or 20 LEDs illuminating the rod from the top and 20 LEDs illuminating the rod from the bottom.

Hence, in an embodiment a light emitting device is provided, the light emitting device comprising at least two light sources adapted for, in operation, emitting light with a first spectral distribution, a first light guide comprising a first light input surface and a first light exit surface, the first light guide being adapted for receiving the light with the first spectral distribution at the first light input surface, converting at least a part of the light with the first spectral distribution to light with a second spectral distribution, guiding the light with the second spectral distribution to the first light exit surface and coupling the light with the second spectral distribution out of the first light exit surface, the at least two light sources being arranged at mutually different distances from the first light exit surface of the first light guide, and a control device adapted for changing the spectral characteristics of the second spectral distribution by individually controlling the light sources, wherein the light source of the at least two light sources which is arranged at a largest distance from the first light exit surface of the first light guide produces a red-shifted second spectral distribution with respect to light generated by the light source of the at least two light sources which is arranged at a smallest distance from the first light exit surface of the first light guide.

As indicated above, we suggest the use of a luminescent material chosen such that there is a large overlap between the emission and absorption spectra (FIG. 1b). The (large) overlap leads to a strong re-absorption of light emitted by the luminescent concentrator and hence to a strong dependence of the end spectrum to the length of the luminescent rod.

Figure 2A:
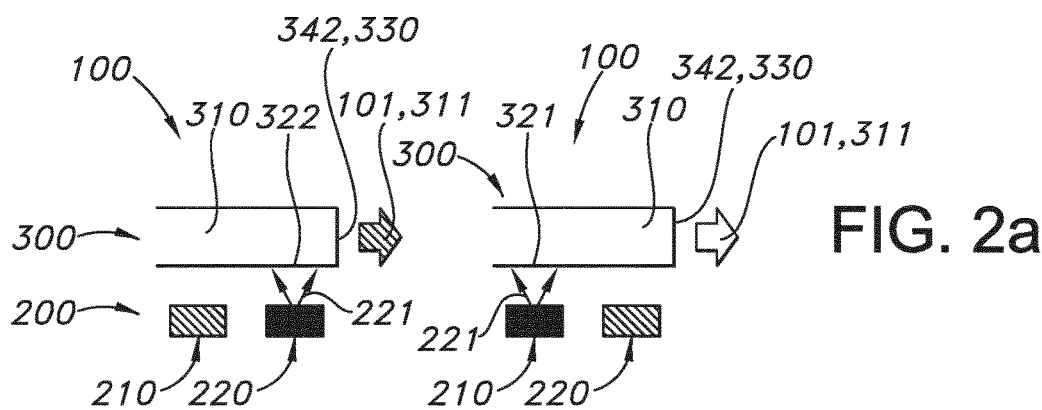

The lighting device may comprise in an embodiment a single light exit surface (FIG. 2a). By way of example, the difference in color of the lighting device light as function of the light source that is switched on is indicated by difference in shading of the lighting device light 101. This difference is especially due to the difference in the luminescent material light 311.

Figure 2B:
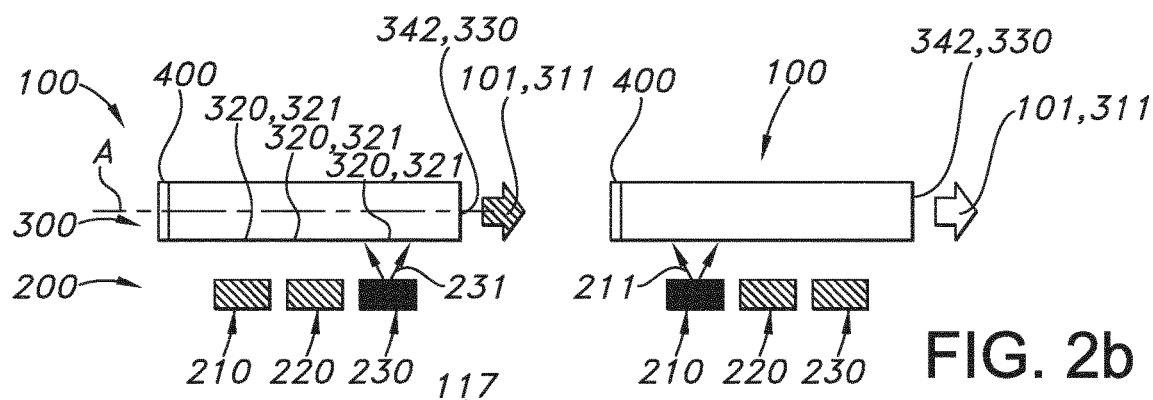

The light guide 300, such as a luminescent concentrator, might also comprise a back reflector (FIG. 2b). However, in this configuration light might be reflected back by the back reflector and therefore this might slightly change the spectral distributions. Due to light losses in the rod (e.g. by slight surface scattering, small scattering in the rod, reflection losses) the contribution of the back reflected light is relatively small. The (back) reflector might be without optical contact with the light guide 300, such as the luminescent rod. Reflectors are herein indicated with reference 400.

Figure 2C:
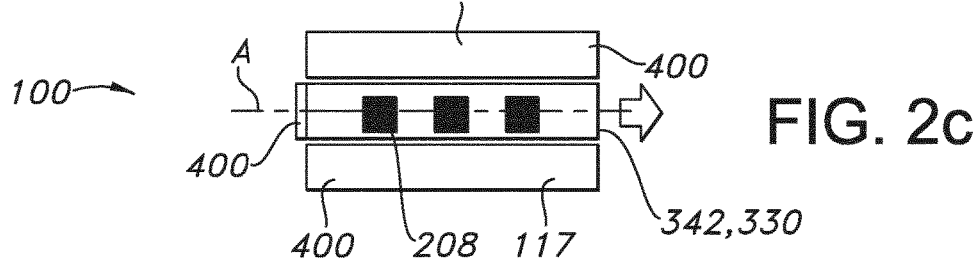

The light guide 300, such as a luminescent concentrator, might also comprise addition reflectors 400 which are positioned preferably without any optical contact with the luminescent concentrator. Further, the lighting device may include a heat sink 117. In FIG. 2c schematically an embodiment is depicted wherein additional reflectors 400 comprise a heat sink element 117.

Figure 2D:
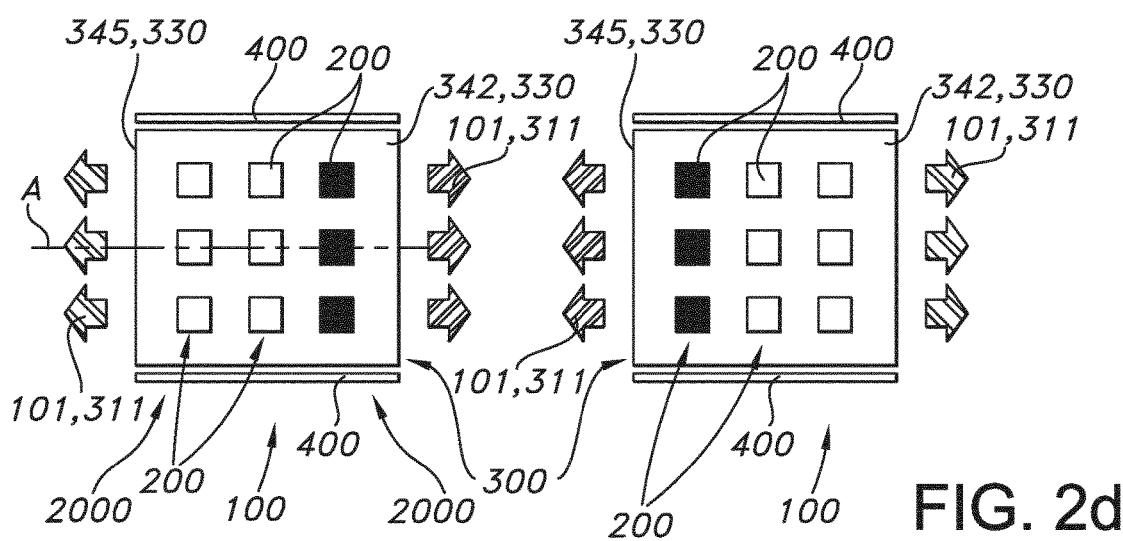

In yet another embodiment, the lighting device comprises more than one light exit surface 330 such as two light exit surfaces. It goes without saying that the light characteristics of the light exiting the second light exit surface also depends on the position of the LED with respect to the light exit surface. The light emitting device may also comprise a matrix of LEDs (FIG. 2d). In this way, also more complex light spectral distribution can be obtained (FIGS. 2e and 2f). In the latter figure, the light emitting device might also comprise three light exit surfaces (FIG. 2f). Of course, the light emitting device might also comprise four light exit surfaces. In FIG. 2f, by way of example a plurality of body axes A are indicated. The light incoupling areas illuminated by the light sources 200 are substantially perpendicular to the light exit windows 330.

Figure 2G:
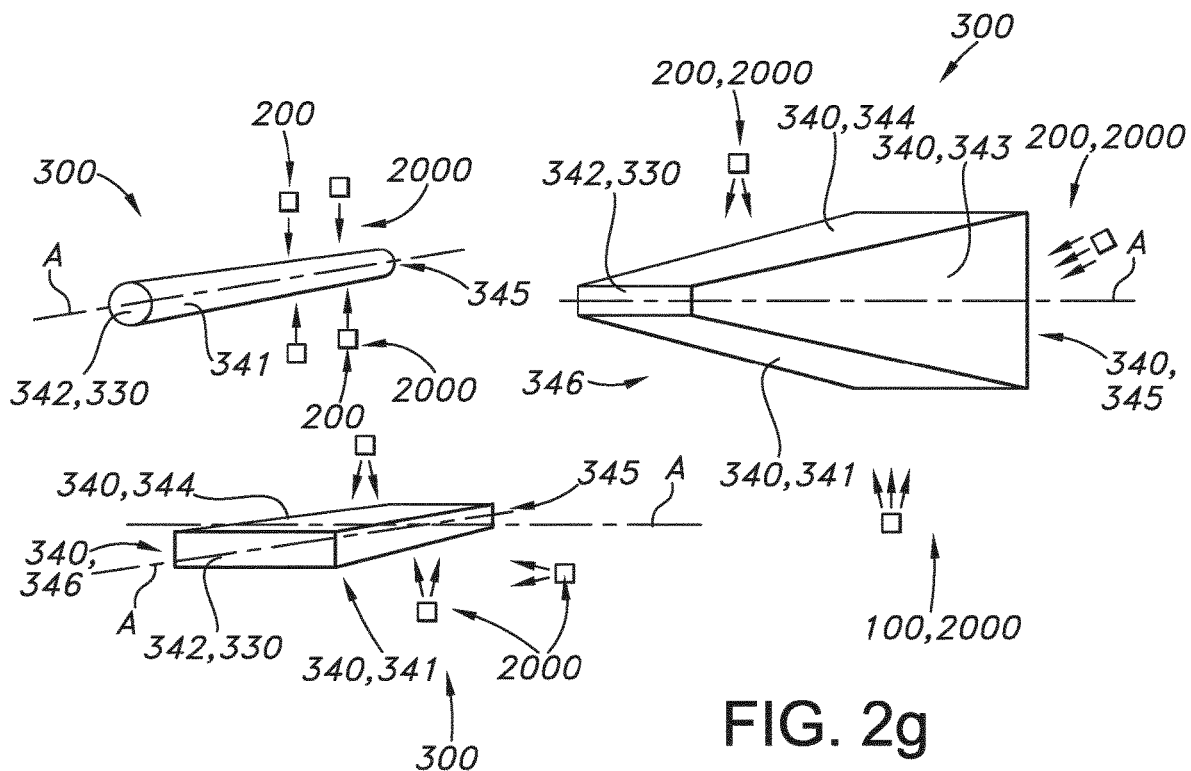

FIG. 2g schematically depict some further embodiments of the light guide 300, with a tubular type of light guide, a wedge shaped type of light guide, and a planar (rod or beam) shaped type of light guide 300. Other shapes may also be possible. By way of example, a plurality of light sources is depicted, to show that different subsets 2000 of light sources may be to irradiate the light guide.

Figure 2H:
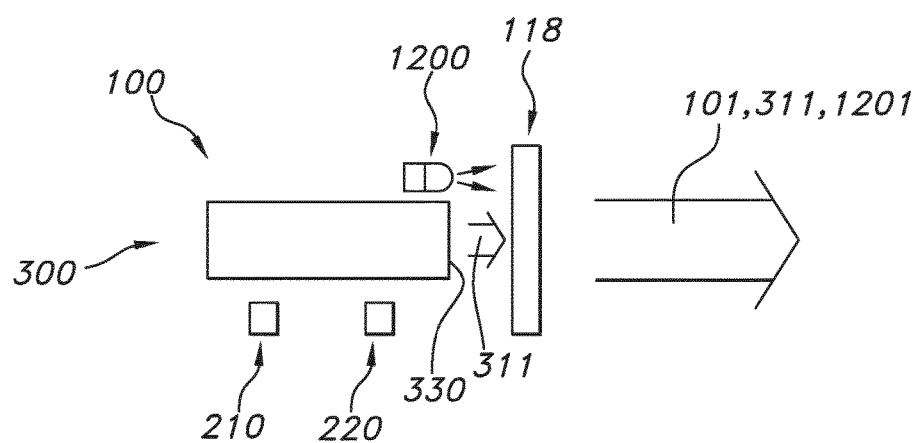

FIG. 2h schematically depicts an embodiment of the lighting device 100 comprising a further light source 1200. This light source may for instance have no interaction with the light guide 300. Further light source light 1201 and the luminescent material light 311, and optionally light source light may be comprised by the lighting device light 101. A diffusor 118 may be used to mixed the different types of light.

The light emitting device might also comprise a sensor/detector for detecting a specific signal (e.g. temperature, humidity, position, location, time, intensity, color, etc.) and the light sources may be controlled accordingly to the signal sensed by the controller.

In another embodiment, the lighting device may comprise a sensor which integrated in the system such that it measures the light generation of the light sources or lighting device.

The invention claimed is:

1. A lighting device comprising:
a plurality of light sources configured to provide light source light, the plurality of light sources comprising at least a first light source configured to generate first light source light and a second light source configured to generate second light source light;
a light guide comprising a luminescent material, a light exit window, and a plurality of light incoupling areas, the luminescent material configured to be excitable by the light source light, to provide luminescent material light and to reabsorb at least part of the luminescent material light, the light exit window configured for escape of the luminescent material light from the light guide to produce lighting device light, the plurality of light incoupling areas arranged perpendicular to the light exit window and comprising at least a first light incoupling area configured at a first distance from the light exit window, and a second light incoupling area configured at a second distance from the light exit window, the first distance being unequal to the second distance, the first light source is configured to provide the first light source light to the first light incoupling area, and the second light source is configured to provide the second light source light to the second light incoupling area; and
a control unit arranged for controlling a color temperature of the lighting device light by independently controlling the plurality of light sources dependent on a distance each light source is from the light exit window.

2. The lighting device according to claim 1, wherein the light guide further comprises a plurality of faces, wherein at least part of a first face is configured as the first light incoupling area and the second light incoupling area, and wherein at least part of a second face is configured as the light exit window.

3. The lighting device according to claim 1, wherein the control unit is further arranged to select which light source from the plurality of slight sources to switch on and to adjust a relative intensity of the plurality of light sources dependent on the distance each light source is from the light exit window.

4. The lighting device according to claim 1 further comprising a plurality of light exit windows arranged perpendicular to the plurality of light incoupling areas.

5. The lighting device according to claim 1, wherein the plurality of light sources are at least 3 in number, and wherein each distance of the plurality of light incoupling areas to the light exit window are different.

6. The lighting device according to claim 2, wherein the plurality of light sources comprises two or more subsets each comprising one or more light sources, wherein each subset of light sources is configured to provide light source light to a different face from the plurality of faces of the light guide.

7. The lighting device according to claim 1, wherein the light guide comprises a light guide material wherein the luminescent material is embedded.

8. The lighting device according to claim 7, wherein the light guide material comprises a polymeric material.

9. The lighting device according to claim 7, wherein the light guide material comprises an inorganic material or a hybrid material having both inorganic and organic character.

10. The lighting device according to claim 7, wherein the light guide material comprises a ceramic material.

11. The lighting device according to claim 1, wherein the luminescent material comprises an organic dye, quantum dots, and/or a luminescent ion based luminescent material.

12. The lighting device according to claim 1, wherein the luminescent material has an emission spectrum and an excitation spectrum having spectral overlap, wherein the normalized spectral overlap is greater than 0.02 and less than or equal to 0.5.

13. The lighting device according to claim 1, wherein the light source light of the plurality of light sources have spectral overlap.

14. The lighting device according to claim 1, wherein the first distance is larger than the second distance, and the first light source is arranged to produce a red-shifted spectral distribution with respect to light generated by the second light source.

15. A method of controlling a lighting device, the method comprising:
   providing light source light from a plurality of light sources, the plurality of light sources comprising at least a first light source generating first light source light and a second light source generating second light source light;
   exciting a luminescent material in a light guide with the light source light, the light guide further comprising a light exit window and a plurality of light incoupling areas, the plurality of light incoupling areas arranged perpendicular to the light exit window and comprising at least a first light incoupling area configured at a first distance from the light exit window, and a second light incoupling area configured at a second distance from the light exit window, the first distance being unequal to the second distance, wherein the first light source provides the first light source light to the first light incoupling area, and the second light source provides the second light source light to the second light incoupling area;
   providing, by the luminescent material excited by the light source light, luminescent material light;
   reabsorbing, by the luminescent material, least part of the luminescent material light;
   providing lighting device light from the luminescent material light escaping from the light exit window; and
   controlling a color temperature of the lighting device light by independently controlling the plurality of light sources dependent on a distance each light source is from the light exit window.

16. The lighting device according to claim 1 further comprising a radiation input face, the radiation input face comprising the plurality of light incoupling areas, wherein the light exit window has a radiation exit face area, and the radiation input face has a radiation input face area, and wherein the radiation input face area is at least five times larger than the radiation exit face area.

17. The lighting device according to claim 1, wherein the lighting device light comprises at least part of the light source light in addition to the luminescent material light.

18. The lighting device according to claim 1 further comprising:
   a further light source light configured to provide further light source light, wherein the further light source light has no interaction with the light guide; and
   a diffuser in paths of the further light source light and the lighting device light.

19. The lighting device according to claim 1, wherein the plurality of light sources comprises a plurality of light emitting diode light sources.

* * * * *